United States Patent
Ly et al.

(10) Patent No.: US 10,194,410 B2
(45) Date of Patent: Jan. 29, 2019

(54) SYNCHRONIZATION SIGNAL BLOCKS

(71) Applicant: QUALCOMM Incorporated, San Diego, CA (US)

(72) Inventors: Hung Ly, San Diego, CA (US); Tao Luo, San Diego, CA (US); Haitong Sun, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/897,985

(22) Filed: Feb. 15, 2018

(65) Prior Publication Data

US 2018/0234931 A1    Aug. 16, 2018

Related U.S. Application Data

(60) Provisional application No. 62/459,973, filed on Feb. 16, 2017, provisional application No. 62/462,258, filed on Feb. 22, 2017.

(51) Int. Cl.
*H04W 56/00* (2009.01)
*H04L 5/00* (2006.01)
(Continued)

(52) U.S. Cl.
CPC ......... *H04W 56/001* (2013.01); *H04L 5/0048* (2013.01); *H04L 5/0051* (2013.01);
(Continued)

(58) Field of Classification Search
CPC . H04L 25/022; H04L 27/2662; H04L 5/0007; H04L 5/0023; H04B 7/0617;
(Continued)

(56) References Cited

U.S. PATENT DOCUMENTS

2015/0296486 A1   10/2015 Park et al.
2015/0304932 A1   10/2015 Wei et al.
(Continued)

OTHER PUBLICATIONS

Huawei et al., "Discussion on SS Burst Set Composition and SS Block Time Index Indication", 3GPP Draft; R1-1703353, 3rd Generation Partnership Project (3GPP), Mobile Competence Centre; 650, Route Des Lucioles; F-06921 Sophia-Antipolis Cedex; France vol. RAN WG1, No. Athens, Greece; 20170213-20170217 Feb. 12, 2017 (Feb. 12, 2017), XP051210483, pp. 1-7, Retrieved from the Internet: URL:http://www.3gpp.org/ftp/Meetings_3GPP SYNC/ RAN1/Docs/ [retrieved on Feb. 12, 2017].
(Continued)

*Primary Examiner* — Mewale A Ambaye
*Assistant Examiner* — Mewale Ambaye
(74) *Attorney, Agent, or Firm* — Arent Fox LLP

(57) ABSTRACT

A base station may transmit a plurality of synchronization signals in a wireless communication system. The synchronization signals may be multiplexed to form a SS block that is transmitted as part of an SS burst. Each SS block may be identifiable based on SS block index information carried by its corresponding synchronization signals. In one aspect, a synchronization signal that carries SS block index information is frequency division multiplexed with a secondary synchronization signal of the SS block. In one aspect, the synchronization signal that carries the SS block index information comprises a DM-RS for a PBCH of the SS block. A UE may use the SS block index information to identify a beam on which the SS block is transmitted. The UE may use the synchronization signals as part of a cell search procedure by which it acquires time and frequency synchronization with the base station.

14 Claims, 18 Drawing Sheets

(51) Int. Cl.
*H04W 72/00* (2009.01)
*H04W 88/02* (2009.01)
*H04W 88/08* (2009.01)

(52) U.S. Cl.
CPC ......... *H04L 5/0053* (2013.01); *H04W 72/005* (2013.01); *H04W 88/02* (2013.01); *H04W 88/08* (2013.01)

(58) Field of Classification Search
CPC ......... H04B 7/216; H04J 11/003; H04J 1/065; H04J 2011/0003
See application file for complete search history.

(56) References Cited

U.S. PATENT DOCUMENTS

| | | | | |
|---|---|---|---|---|
| 2016/0277225 | A1* | 9/2016 | Frenne | H04W 56/0015 |
| 2016/0337105 | A1* | 11/2016 | Lawton | H04L 5/0057 |
| 2017/0041894 | A1* | 2/2017 | Lee | H04J 11/00 |

OTHER PUBLICATIONS

International Search Report and Written Opinion—PCT/US2018/000081—ISA/EPO—dated Jun. 1, 2018.

Nokia et al., "SS Bandwidth, Numerology and Multiplexing", 3GPP Draft; R1-1701056, 3rd Generation Partnership Project (3GPP), Mobile Competence Centre; 650, Route Des Lucioles; F-06921 Sophia-Antipolis Cedex, France vol. RAN WG1, no. Spokane, U.S.A, 20170116-20170120, Jan. 16, 2017 (Jan. 16, 2017), XP051208571, pp. 8, Retrieved from the Internet: URL:http://www.3gpp.org/ftp/Meetings_3GPP_SYNC/RAN1/Docs/ [retrieved on Nov. 13, 2016].

ZTE Microelectronics: "Considerations on SS Block Design", 3GPP Draft; R1-1611268, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 13, 2016, XP051175249, 7 pages, Retrieved from the Internet:URL:http://www.3gpp.org/ftp/Meetings_3GPPSYNC/RAN1/Docs/ [retrieved on Nov. 13, 2016].

Cisco et al., "Verizon 5G TF; Air Interface Working Group; Verizon 5th Generation Radio Access; Physical channels and modulation (Release 1)", TS V5G.211 V1.7, Oct. 2016, [online] [retrieved on Oct. 24, 2018]. Retrieved from the Internet <URL http://www.5gtf.net/V5G_211_v1p7.pdf>, 83 pages.

Ericsson et al., "KT PyeongChang 5G Special Interest Group (KT 5G-SIG); KT 5th Generation Radio Access; Physical Layer; Physical channels and modulation (Release 1)", TS 5G.211, V2.6, Sep. 2016, [online] [retrieved on Oct. 24, 2018]. Retrieved from the Internet <URL https://corp.kt.com/data/kthome/business/kt5g/5G_211_v2.6.pdf>, pp. 1-66.

* cited by examiner

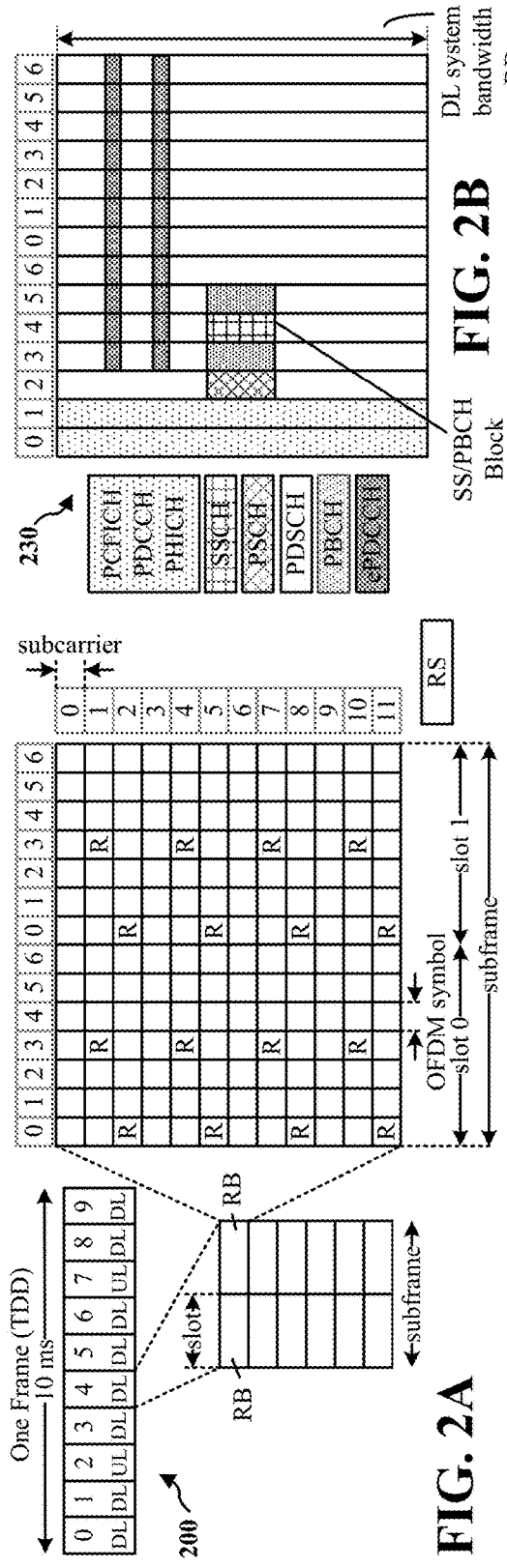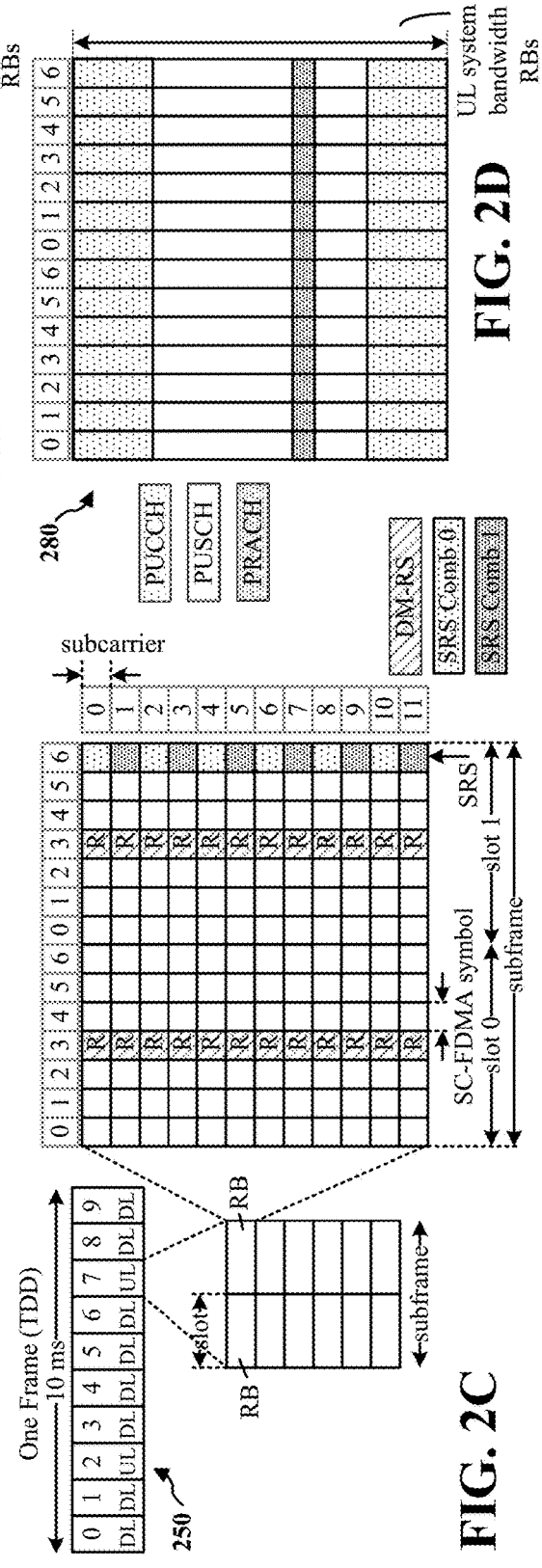

SYNCHRONIZATION SIGNAL BLOCKS

CROSS-REFERENCE TO RELATED APPLICATION(S)

This application claims the benefit of U.S. Provisional Application Ser. No. 62/459,973, entitled "TERTIARY SYNCHRONIZATION SIGNAL DESIGN CONSIDERATIONS" and filed on Feb. 16, 2017, and U.S. Provisional Application Ser. No. 62/462,258, entitled "TERTIARY SYNCHRONIZATION SIGNAL DESIGN CONSIDERATIONS" and filed on Feb. 22, 2017, both of which are expressly incorporated by reference herein in each application's entirety.

BACKGROUND

Technical Field

The present disclosure relates generally to communication systems, and more particularly, to a synchronization signal (SS) blocks that include beam index information.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Synchronization within a wireless communication system may be accomplished using synchronization signals. In LTE and NR systems, such synchronization signals may include a primary synchronization signal (PSS), a second synchronization signal (SSS), and a physical broadcast channel (PBCH). In some systems, the synchronization signals may be multiplexed into one or more synchronization signal blocks (SS blocks). Different SS blocks may be identified according to SS block identifiers, which, in turn, may correspond to different beams on which the SS blocks are transmitted. As disclosed herein, multiplexing of synchronization signals in an SS block may performed such that a secondary synchronization signal (SSS) which may carry information about a physical layer cell identity group number and/or radio frame timing information for a base station is frequency division multiplexed with one or more synchronization signals of the SS block with provided the SS block identifier.

In an aspect of the disclosure, a method, a computer-readable medium, and an apparatus are provided. The apparatus may be configured to determining a synchronization signal (SS) index for a SS block, the SS block comprising a plurality of synchronization signals multiplexed for transmission on predetermined resources and generating a first SS of the plurality of synchronization signals based at least in part on the SS index. The apparatus may be configured to frequency division multiplexing the first SS with at least a second synchronization signal (SSS) of the SS block, wherein the SSS comprises a secondary synchronization signal that carries information about a physical layer cell identity group number for the base station and transmitting the SS block including the first SS generated based at least in part on the SS block identifier frequency division multiplexed with the SSS on the predetermined resources.

In another aspect of the disclosure, a method, a computer-readable medium, and an apparatus are provided. The apparatus may be configured to receive a synchronization signal block with a first synchronization signal (SS) comprising a SS index for the SS block frequency division multiplexed with a second synchronization signal (SSS) on predetermined resources, wherein the SSS carries information about a physical layer call identity group number for a base station. The apparatus may be configured to demultiplexing the first SS and the SSS and obtaining the SS index and the information about the physical layer cell identity group number for the base station and communicating with the base station based on information from the SS block.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL subframe, DL channels within the DL subframe, an UL subframe, and UL channels within the UL subframe, respectively, for a 5G/NR frame structure.

DETAILED DESCRIPTION

Figure 1:
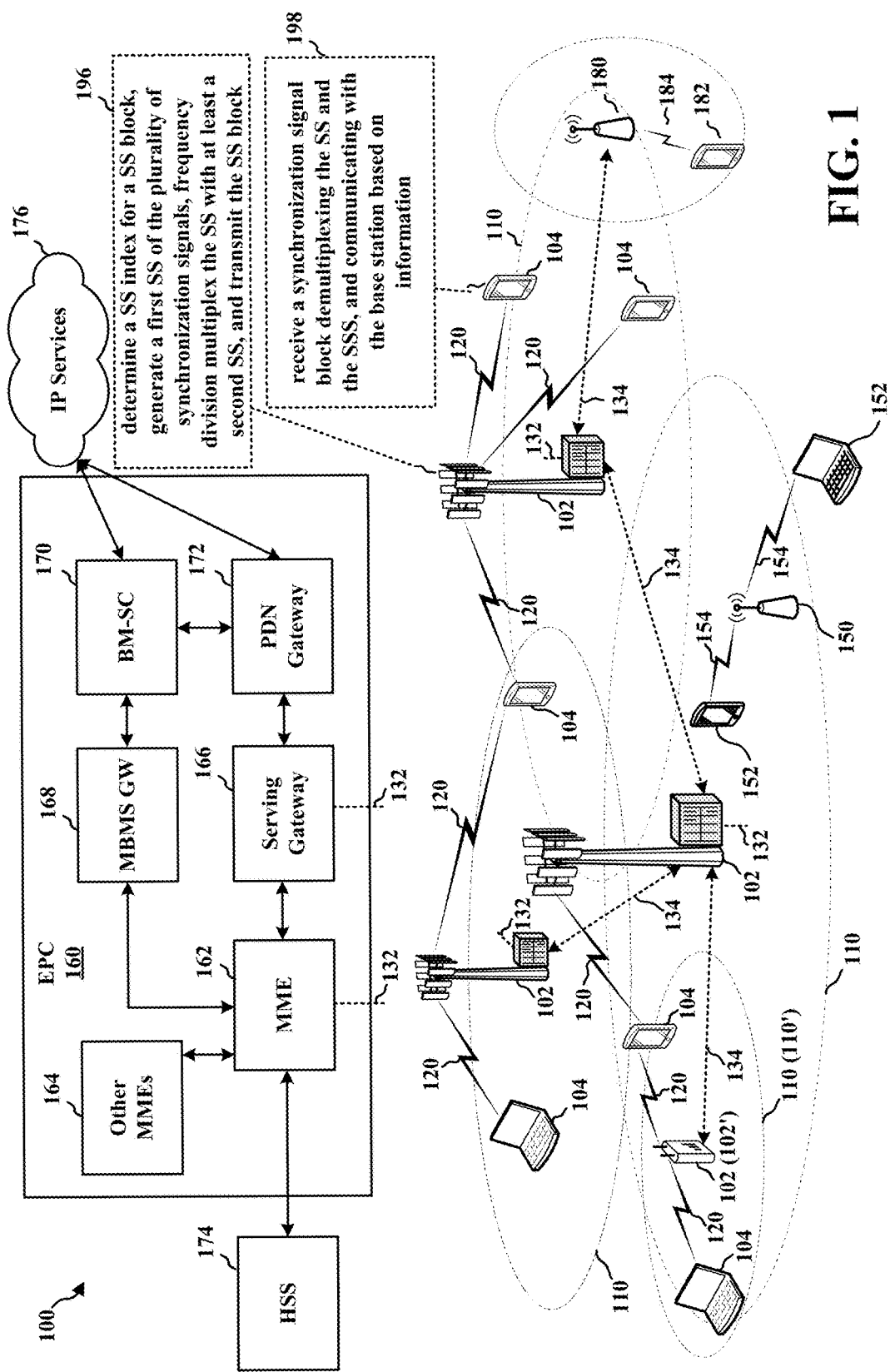
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to, and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the eNB/gNB 102/180 may be configured to multiplex a plurality of synchronization signals, including a PSS, a SSS, or a PBCH, for transmission in a SS block. For example, the apparatus may be configured to determining a synchronization signal (SS) index for a SS block, the SS block comprising a plurality of synchronization signals multiplexed for transmission on predetermined resources and generating a SS of the plurality of synchronization signals based at least in part on the SS index. The apparatus may be configured to frequency division multiplexing the first SS with at least a second synchronization signal (SSS) of the SS block, wherein the SSS comprises a secondary synchronization signal that carries information about a physical layer cell identity group number for the base station and transmitting the SS block including the first SS generated based at least in part on the SS block identifier frequency division multiplexed with the SSS on the predetermined resources (196).

Additionally, in certain aspects, the UE 104 may be configured to receive a synchronization signal block with a first synchronization signal comprising a SS index for the SS block frequency division multiplexed with a second synchronization signal (SSS) on predetermined resources, wherein the SSS carries information about a physical layer cell identity group number for a base station. The UE 104 may be configured to demultiplexing the first SS and the SSS and obtaining the SS index and the information about the physical layer cell identity group number for the base station and communicating with the base station based on information from the SS block (198).

The SS may be utilized in connection with beamforming. Beamforming is discussed below with respect to FIGS. 4A through 4G. The SS may provide a block index that may be used to determine a beam direction.

FIG. 2A is a diagram 200 illustrating an example of a DL subframe within a 5G/NR frame structure. FIG. 2B is a diagram 230 illustrating an example of channels within a DL subframe. FIG. 2C is a diagram 250 illustrating an example of an UL subframe within a 5G/NR frame structure. FIG. 2D is a diagram 280 illustrating an example of channels within an UL subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 a DL subframe and subframe 7 an UL subframe. While subframe 4 is illustrated as providing just DL and subframe 7 is illustrated as providing just UL, any particular subframe may be split into different subsets that provide both UL and DL. Note that the description infra applies also to a 5G/NR frame structure that is FDD.

Other wireless communication technologies may have a different frame structure and/or different channels. A frame (10 ms) may be divided into 10 equally sized subframes (1 ms). Each subframe may include one or more time slots. Each slot may include 7 or 14 symbols, depending on the slot configuration. For slot configuration 0, each slot may include 14 symbols, and for slot configuration 1, each slot may include 7 symbols. The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. The subcarrier spacing and symbol length/duration are a function of the numerology. The subcarrier spacing may be equal to $2^{\mu}*15$ kKz, where $\mu$ is the numerology 0-5. The symbol length/duration is inversely related to the subcarrier spacing. FIGS. 2A, 2C provide an example of slot configuration 1 with 7 symbols per slot and numerology 0 with 2 slots per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE (indicated as R). The RS may include demodulation RS (DM-RS) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal SS/PBCH block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
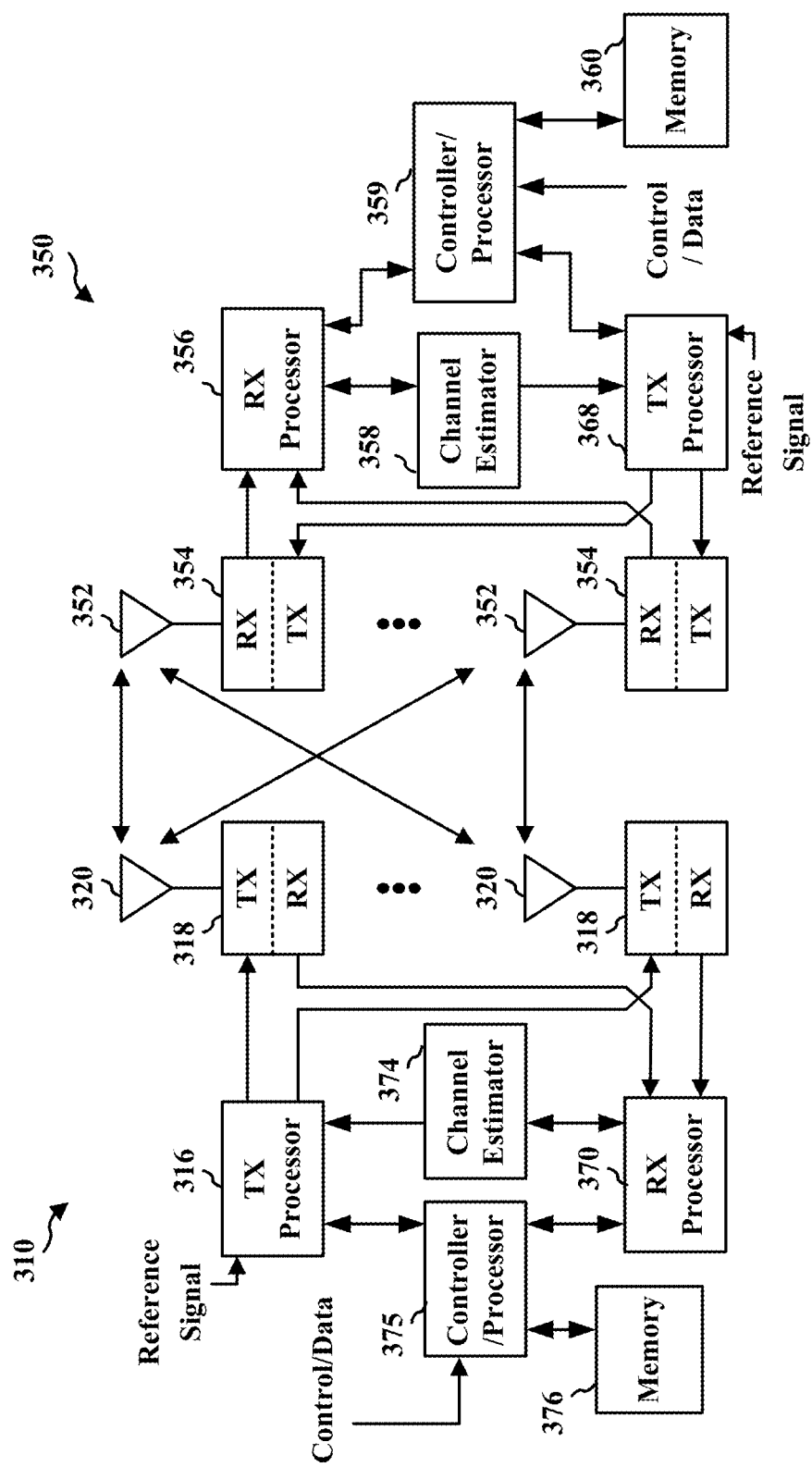
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

In an aspect, one or more of the TX processor 316 and the controller/processor 375 may generate SS blocks. The one or more processors (e.g., the TX processor 316 and/or the controller/processor 375) may cause the SS blocks to be transmitted, e.g., by one or more transmitters transmitter 318TX.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal-processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

In an aspect, the receiver 354RX may receive SS blocks. One or more of the RX processor 356 and the controller/processor 359 may process the SS blocks to acquire frequency/time synchronization, e.g., using one or more of the PSS, SSS, and SS. The UE 350 may perform an initial acquisition based on the SS block. Accordingly, as described herein, the SS signals (the PSS, the SSS, PBCH, and/or other SS) may be used to perform synchronization and/or cell identification in a communication system. Furthermore, scrambling in different ways as described herein may provide for better separation. How SS is multiplexed may impact detection complexity, timing resolution, range of index values, etc. In an aspect a UE may communicate with a base station once, the SS block index information is obtained and timing is set based on PSS/SSS.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

FIGS. 4A through 4G are diagrams illustrating an example of the transmission of beamformed signals between a base station and a UE. The base station 402 may be embodied as a base station in a mmW system (mmW base station), such as a gNB or the mmW base station 180. In one aspect, the base station 402 may be collocated with another base station, such as an eNB/gNB, a cellular base station, or other base station (e.g., a base station configured to communicate in a sub-6 GHz band). While some beams are illustrated as adjacent to one another, such an arrangement may be different in different aspects (e.g., beams transmitted during a same symbol may not be adjacent to one another). Additionally, the number of illustrated beams is to be regarded as illustrative.

Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters (the super high frequency (SHF) band extends between 3 GHz and 30 GHz, also referred to as centimeter wave). While the disclosure herein refers to mmWs, it should be understood that the disclosure also applies to near mmW based communication. Further, while the disclosure herein refers to mmW base stations, it should be understood that the disclosure also applies to near-mmW base stations.

In order to build a useful communication network in the millimeter wavelength spectrum, a beamforming technique may be used to compensate for path loss. Beamforming techniques focus the RF energy into a narrow direction to allow the RF beam to propagate farther in that direction. Using the beamforming technique, non-line of sight (NLOS) RF communication in the millimeter wavelength spectrum may rely on reflection and/or diffraction of the beams to reach the UE. If the direction becomes blocked, either because of UE movement or changes in the environment (e.g., obstacles, humidity, rain, etc.), the beam may not be able to reach the UE. Thus, in order to ensure that the UE has continuous, seamless coverage, multiple beams in as many different directions as possible may be available. In an aspect, the beamforming technique may require that the mmW base stations and the UEs transmit and receive in a direction that allows the most RF energy to be collected.

The base station 402 may include hardware for performing analog and/or digital beamforming. For example, the base station 402 may transmit a SS block. The SS block may be utilized in connection with beamforming. The SS block may include an SS block index or SS block identifier. In an aspect, systems and methods described herein may distinguish different beams according to indices, e.g., an SS block index. The indices may be provided in SS blocks according to the present disclosure. The SS block index may be decoded and used to determine a beam direction. If the base station 402 is equipped with analog beamforming, at any one time, the base station 402 may transmit or receive a signal in only one direction. If the base station 402 is equipped with digital beamforming, the base station 402 may concurrently transmit multiple signals in multiple directions or may receive multiple signals concurrently in multiple directions.

Further, the UE 404, for example, may include hardware for performing analog and/or digital beamforming. If the UE 404 is equipped with analog beamforming, at any one time, the UE 404 may transmit or receive a signal in only one direction. If the UE 404 is equipped with digital beamforming, the UE 404 may concurrently transmit multiple signals in multiple directions or may concurrently receive multiple signals in multiple directions.

In the mmW network, UEs may perform beam sweeps with mmW base stations within range. For example, the base station 402 may transmit m beams in a plurality of different spatial directions. The UE 404 may listen/scan for the beam transmissions from the base station 402 in n different receive spatial directions. When listening/scanning for the beam transmissions, the UE 404 may listen/scan for the beam sweep transmission from the base station 402 m times in each of the n different receive spatial directions (a total of m*n scans). In another aspect, in a beam sweep, the UE 404 may transmit n beams in a plurality of different spatial directions. The base station 402 listens/scans for the beam transmissions from the UE 404 in m different receive spatial directions. When listening/scanning for the beam transmissions, the base station 402 may listen/scan for the beam sweep transmission from the UE 404 n times in each of the m different receive spatial directions (a total of m*n scans).

Based on the performed beam sweeps, the UEs and/or the mmW base stations may determine a channel quality associated with the performed beam sweeps. For example, the UE 404 may determine the channel quality associated with the performed beam sweeps. Alternatively, the base station 402 may determine the channel quality associated with the performed beam sweeps. If the UE 404 determines a channel quality associated with the performed beam sweeps, the UE 404 may send the channel quality information (also referred to as beam sweep result information) to the base station 402. The UE 404 may send the beam sweep result information to the base station 402. If the base station 402 determines a channel quality associated with the performed beam sweeps, the base station 402 may send the beam sweep result information to the UE 404. In an aspect, the channel quality may be affected by a variety of factors. The factors include movement of the UE 404 along a path or due to rotation (e.g., a user holding and/or rotating the UE 404), movement along a path behind obstacles, and/or movement within particular environmental conditions (e.g., obstacles, rain, humidity). The UE 404 and the base station 402 may also exchange other information, for example, associated with for beamforming (e.g., analog or digital beamforming capabilities, beamforming type, timing information, configuration information, etc.).

Based on the received information, the base station 402 and/or the UE 404 may determine various configuration information, such as mmW network access configuration information, information for adjusting beam sweeping periodicity, information regarding overlapping coverage for predicting a handoff to another base station, such as a mmW base station.

Figure 4B:
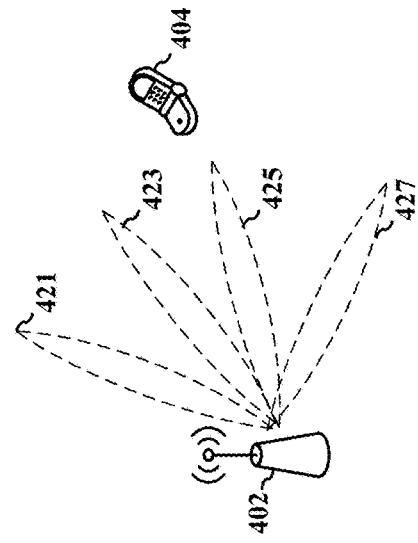
FIGS. 4A through 4G are diagrams illustrating an example of the transmission of beamformed signals between a base station and a UE.

In an aspect, a beam set may contain eight different beams. For example, FIG. 4A illustrates eight beams 421, 422, 423, 424, 425, 426, 427, 428 for eight directions. In aspects, the base station 402 may be configured to beamform for transmission of at least one of the beams 421, 422, 423, 424, 425, 426, 427, 428 toward the UE 404. In one aspect, the base station 402 can sweep/transmit directions using eight ports during a subframe (e.g., synchronization subframe). In an aspect, the UE 404 may distinguish different beams according to indices. The indices may be provided in SS blocks according to the present disclosure.

In an aspect, a base station may transmit a signal, such as a beam reference signal (BRS), in a plurality of directions, for example, during a synchronization subframe. In one aspect, this transmission may be cell-specific. Referring to FIG. 4B, the base station 402 may transmit a first set of beams 421, 423, 425, 427 in four directions. For example, the base station 402 may transmit a BRS in a synchronization subframe of each of the transmit beams 421, 423, 425, 427. For example, the synchronization subframe may be a SS. The SS may provide a block index. The block index may be used to determine a beam direction.

In an aspect, these beams 421, 423, 425, 427 transmitted in the four directions may be odd-indexed beams 421, 423, 425, 427 for the four directions out of a possible eight for the beam set. For example, the base station 402 may be capable of transmitting beams 421, 423, 425, 427 in directions adjacent to other beams 422, 424, 426, 428 that the base station 402 is configured to transmit. In an aspect, this configuration in which the base station 402 transmits beams 421, 423, 425, 427 for the four directions may be considered a "coarse" beam set.

The UE 404 may determine a respective beam index (sometimes abbreviated as "BI") corresponding to a respective beam. For example, the UE 404 may distinguish different beams according to indices, e.g., the beam index. The indices may be provided in SS blocks according to the present disclosure. In various aspects, the beam index may indicate at least a direction for communicating through a corresponding beam toward the UE 404 (e.g., a beamforming direction). For example, the beam index may be a logical beam index associated with an antenna port, OFDM symbol index, and/or BRS transmission period, which may be indicated by one or more bits (e.g., 9 bits). For example, the UE 404 may be configured to determine a beam index corresponding to a beam based on a time at which a BRS is received—e.g., a symbol or slot during which a BRS is received may indicate a beam index corresponding to a beam.

Figure 4D:
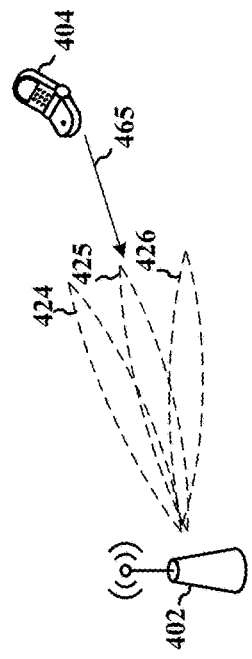
Figure 4A:
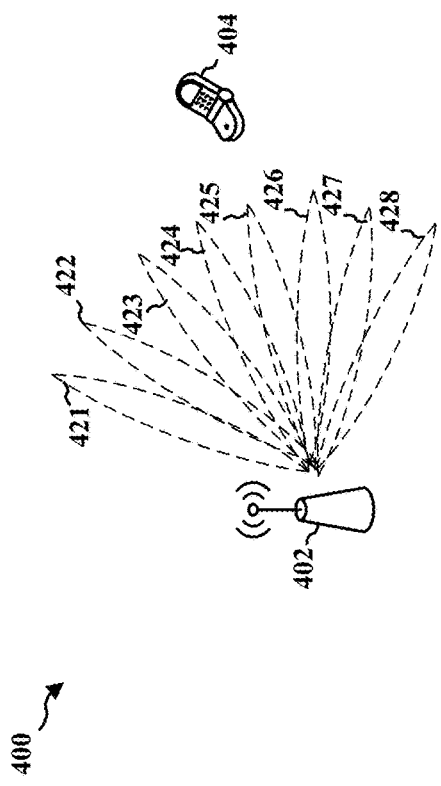
Figure 4C:
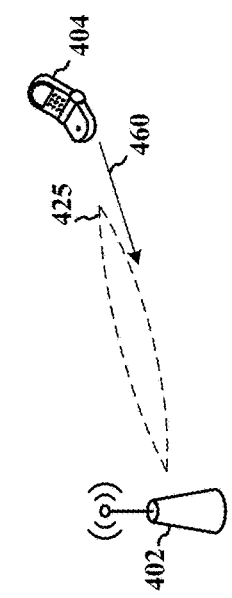

In FIG. 4C, the UE 404 may determine or select a beam index (sometimes abbreviated as "BI") that is strongest or preferable. The beam index may be used to distinguish different beams. The indices may be provided in SS blocks according to the present disclosure. In one example, the UE 404 may determine a beam index from an SS block. The SS block may provide a beam index that may be used to determine a beam direction. In another example, the UE 404 may determine that the beam 425 carrying a BRS is strongest or preferable. The UE 404 may select a beam by measuring values for a received power or received quality associated with each of the first set of beams 421, 423, 425, 427. In one aspect, the received power may be referred to as a BRS received power (BRSRP).

The UE 404 may compare respective values to one another. The UE 404 may select a "best" beam. In an aspect, the best beam may be a beam that corresponds to the greatest or highest value (e.g., the best beam may be a beam with the highest BRSRP). The selected beam may correspond to a beam index used to distinguish different beams, which may be a beam index with respect to the base station 402. For example, the UE 404 may determine that the BRSRP corresponding to the fifth beam 425 is the highest, and therefore the fifth beam 425 is the best beam as determined by the UE 404.

The UE 404 may transmit a first indication 460 of the fifth beam 425 to the base station 402. In an aspect, the first indication 460 may include a request to transmit a beam refinement reference signal (BRRS). The BRRS may be UE-specific. One of ordinary skill would appreciate that the BRRS may be referred to by different terminology without departing from the present disclosure, such as a beam refinement signal, a beam tracking signal, or another term.

In one aspect, the base station 402 may trigger transmission of the first indication 460. For example, the base station 402 may trigger transmission of the first indication 460 by a DCI message.

The base station 402 may receive the first indication 460. In one aspect, the first indication 460 may include a beam adjustment request (BAR) (e.g., a request for beam tracking, a request for a BRRS, a request for the base station to start transmitting on an indicated beam index without any further beam tracking, and the like). In one aspect, the first indication 460 may be indicated by a scheduling request. Based on the first indication 460, the base station 402 may determine the beam index corresponding to the fifth beam 425.

In FIG. 4D, the base station 402 may transmit a second set of beams based on the first indication 460 (e.g., based on a beam index indicated by the first indication 460). For example, the UE 404 may indicate that a fifth beam 425 is the best beam and, in response, the base station 402 may transmit a second set of beams 424, 425, 426 to the UE 404 based on the indicated beam index. In an aspect, the beams 424, 425, 426 transmitted based on the first indication 460 may be closer (e.g., spatially and/or directionally) to the fifth beam 425 than those other beams 421, 423, 427 of the first set of beams.

In an aspect, the beams 424, 425, 426 transmitted based on the first indication 460 may be considered a "fine" beam set. In an aspect, the base station 402 may transmit a BRRS through each of the beams 424, 425, 426 of the fine beam set. In an aspect, the beams 424, 425, 426 of the fine beam set may be adjacent. In an aspect, BRRS transmission can span 1, 2, 5, or 10 OFDM symbols and may be associated with a BRRS resource allocation, BRRS process indication, and/or a beam refinement process configuration.

Based on the BRRS transmission through the beams 424, 425, 426 of the fine beam set, the UE 404 may transmit a second indication 465 to the base station 402 to indicate a "best" beam. In an aspect, the second indication 465 may use two (2) bits to indicate the selected beam. For example, the UE 404 may transmit the second indication 465 that indicates a beam index corresponding to the selected beam 425. In one aspect, the second indication 465 may report beam refinement information (BRI). In one aspect, the second indication 465 may include a resource index (e.g., a BRRS-RI) and/or a reference power (RP) associated with the reception of the BRRS as measured by the UE 404 (e.g., a BRRS-RP). The base station 402 may then communicate with the UE 404 through the selected beam 425. As described herein, knowing a beam index from a synchronization procedure, e.g., from the SS, may be useful for beam selection.

Figure 4E:
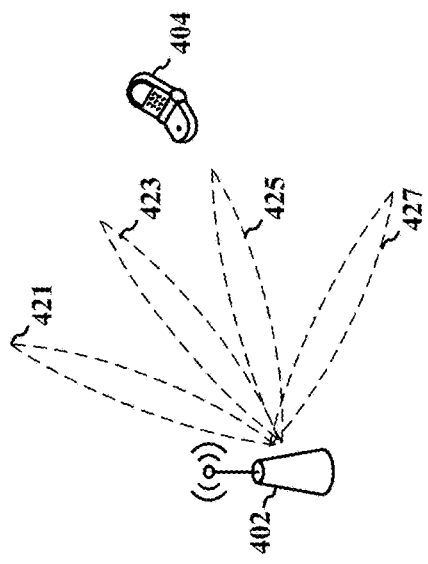

Referring to FIG. 4E, the base station 402 may transmit a BRS in a plurality of directions during a synchronization subframe. In an aspect, the base station 402 may transmit the BRS continuously, e.g., even after the UE 404 has communicated the second indication 465. For example, the base station 402 may transmit beams 421, 423, 425, 427 that each includes a BRS (e.g., a "coarse" beam set).

Figure 4G:
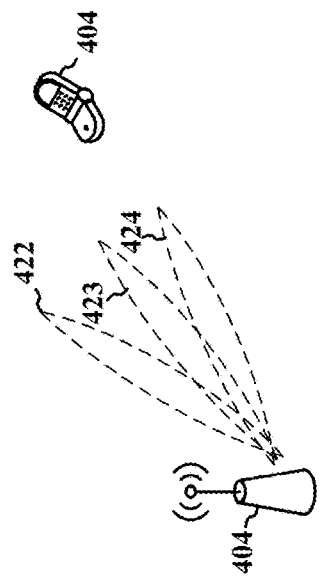
Figure 4F:
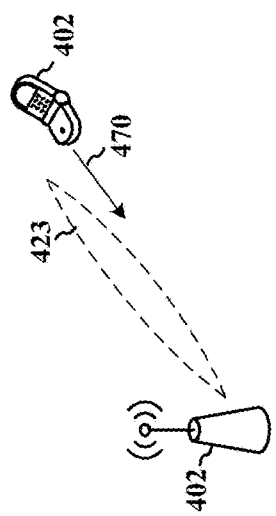

Referring to FIG. 4F, the quality of a selected beam 425 may deteriorate so that the UE 404. For example, when the base station 402 and the UE 404 are communicating through the selected beam 425, the selected beam 425 may become occluded or otherwise unsatisfactory such that the base station 402 and the UE 404 may prefer to communicate through another beam. Based on the BRS (e.g., transmitted during a synchronization subframe), the UE 404 may determine a new beam 423 through which to communicate. For example, the UE 404 may determine that the third beam 423 through which a BRS is communicated may be the best beam. The UE 404 may select a beam based by measuring values for a received power (e.g., BRSRP) or received quality associated with each of the set of beams 421, 423, 425, 427, comparing respective values to one another, and selecting the beam that corresponds to the highest value. The selected beam may correspond to a beam index at the base station 402. The UE 404 may transmit a third indication 470 indicating this beam index to the base station 402. In an aspect, the third indication 470 may include a request to transmit a BRRS. The BRRS may be UE-specific. In one aspect, a BAR may be used to request the base station 402 to transmit a BRRS. In one aspect, the third indication 470 may be triggered by the base station 402, such as by a DCI message. Similar to the first indication 460, the third indication 470 may be included in a scheduling request.

With respect to FIG. 4G, the base station 402 may receive the third indication 470 from the UE 404. The base station 402 may be configured to determine a beam index based on at least the third indication 470. The base station 402 and the UE 404 may perform a beam refinement procedure, such as illustrated with respect to FIG. 4E (e.g., in order to select a new beam through which to communicate).

Figure 5:
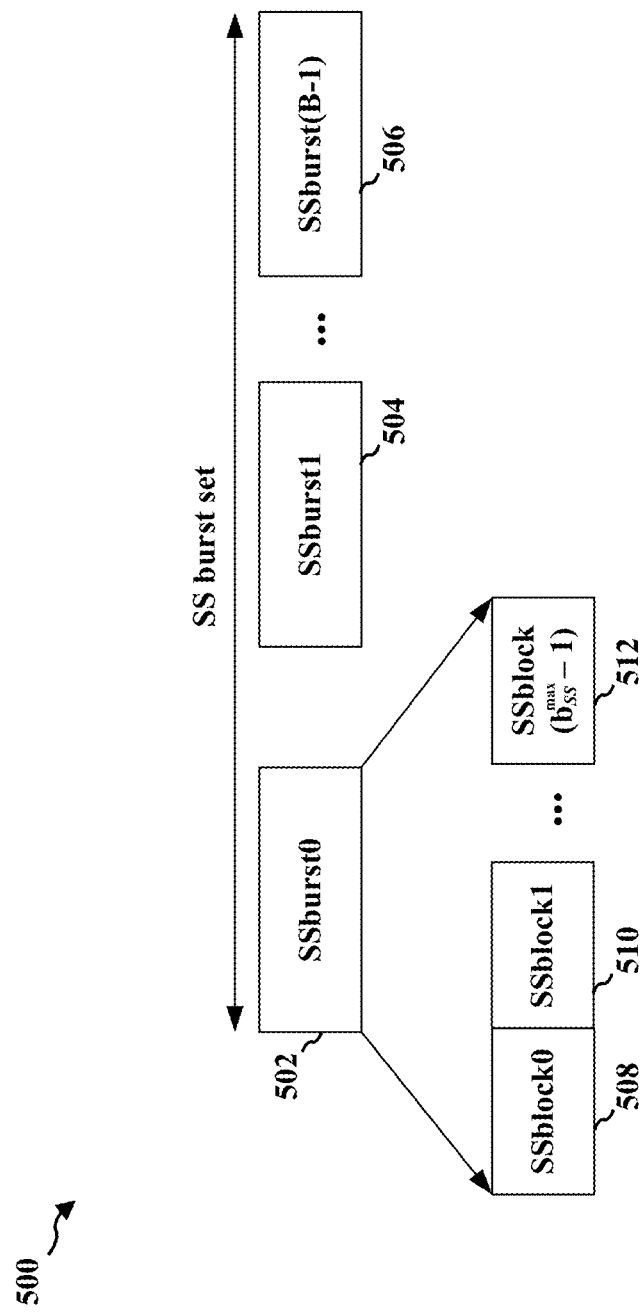
FIG. 5 is a diagram illustrating an example SS burst set.

FIG. 5 is a diagram illustrating an example SS burst set 500. The example SS burst set 500 includes a number of SS bursts (B), where "B" is the total number of bursts. As illustrated in FIG. 5, the SS burst set 500 includes the following, SSburst0 502, SSburst1 504, and SSburst(B-1) 506. Each of the SS bursts (SSburst0 502, SSburst1 504, and SSburst(B-1) 506) include a series of SS blocks 508, 510, 512. For example, FIG. 5 illustrates that SSburst0 502 includes a number, b, SS blocks. An SS block contains synchronization signals and PBCH. The b SS blocks are run from and may be numbered 0 to ($b_{ss}^{max}$-1) and include SSblock0 508, SSblock1 510, and SSblock ($b_{ss}^{max}$-1) 512, for a given burst.

Each SS block 508, 510, 512 may include a plurality of synchronization signals that are multiplexed together. The plurality of synchronization signals may include one or more of a PSS, an SSS, a TSS, or a PBCH. In an example, the PSS may be used to signal symbol timing. The signaling of symbol timing may be used to send timing information that may be used for synchronization of a UE in a communication system. In an example, the SSS may be used to signal a PCI and radio frame timing. The PCI may be used to identify base stations in a communication network. The frame timing is timing information that may be used to synchronize the communication system. In an example, the SS may be used to signal SS block indices. For example, SS can be constructed based on pseudo-noise (PN) sequences and cyclic shifts of pseudo-noise (PN) sequences may be used to signal SS block indices. In an example, the PBCH may be used to signal minimum system information to support a UE in initial access procedures.

In an aspect, the SS signal may convey index information for the SS block that relates to beams, e.g., the beam index or indices of SS block repetitions within a beam. The SS blocks may be repeated within a beam for improved link budget. In some aspects, the SS may be used to provide the beam index and/or SS block repetition index to a UE. Decoding the SS may provide the beam index and/or SS block repetition index to the UE. For example, a base station may transmit a SS. The SS may include a block index that may be used to determine a beam direction.

The example SS burst set 500 may include a plurality of SS blocks 508, 510, 512 that may form an SS burst 502, 504, 506. Each SS block 508, 510, 512 may be identified by an SS block index which may be carried in one or more synchronization signals. In an aspect, the one or more synchronization signals in the SS block may include a PBCH, a PSS, an SSS, a TSS, and/or other SS. Different ones of the synchronization signals may convey some or all of the SS block index. In an aspect, an, e.g., partial, SS block index may be carried in a synchronization signal (e.g., the TSS or other SS) which may be frequency division multiplexed with the other synchronization signals of the SS block. In an aspect, the synchronization signal that carries the, e.g., partial, SS block index may be frequency division multiplexed with the SSS. In an aspect, the SS block may be a DM-RS for the PBCH.

Figure 6:
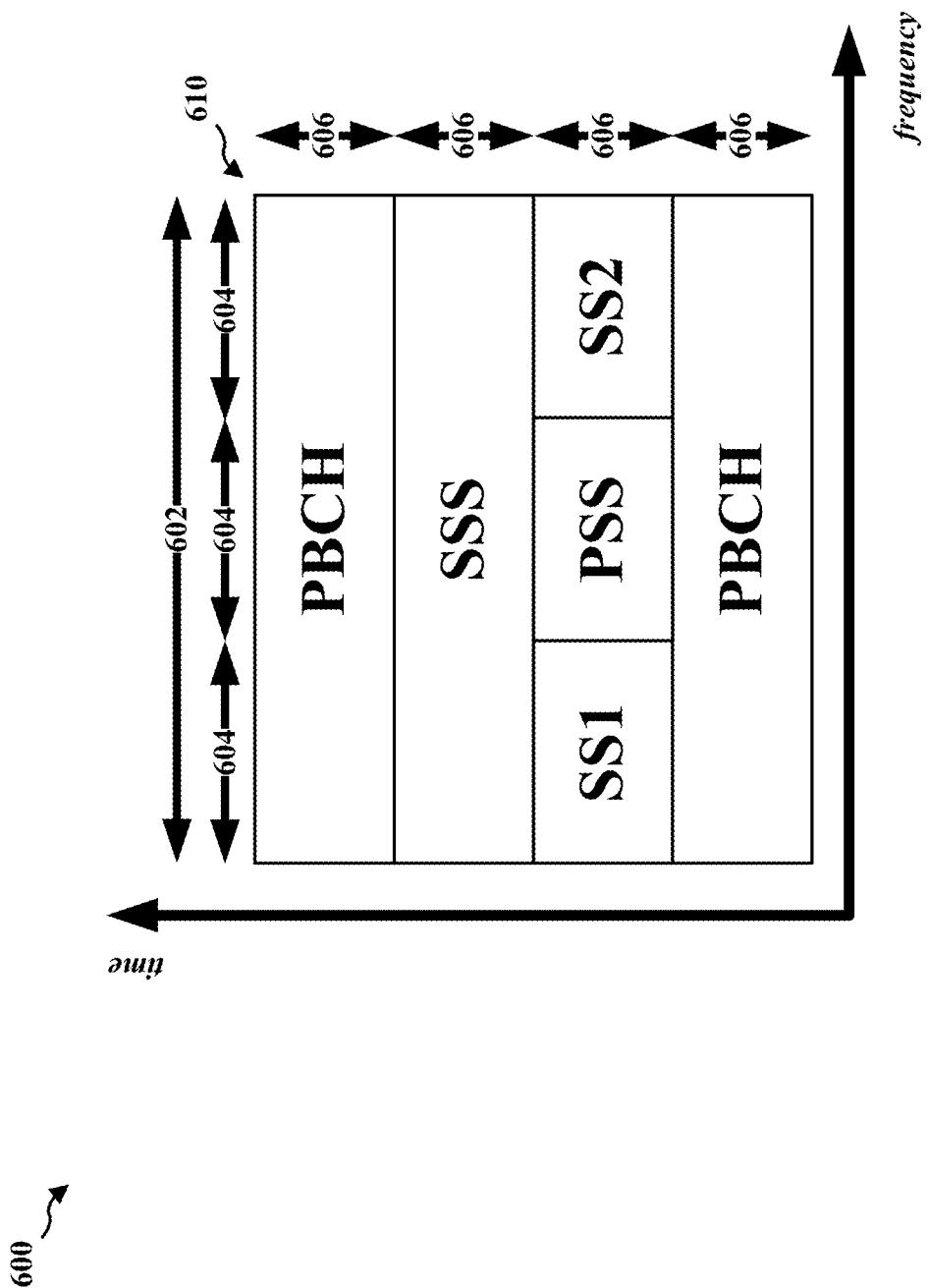
FIG. 6 is a diagram illustrating an example of frequency-division multiplexing of a SS with a PSS in an SS block in accordance with the systems and methods described herein.

FIG. 6 is a diagram illustrating an example of frequency-division multiplexing 600 of a SS with a PSS in an SS block 610 in accordance with the systems and methods described herein. The diagram, illustrating an example of frequency-division multiplexing 600, is a time/frequency diagram. The time/frequency diagram illustrates an example placement of the PSS, the SSS, the SS (SS1, SS2), and the PBCH (two PBCHs) in time and frequency. The PSS, the SSS, the SS (SS1, SS2), the PSS, and the PBCH (two PBCHs) may be transmitted as part of an SS block 610.

In the example of FIG. 6, the SS is frequency-division multiplexed with the PSS. In frequency-division multiplexing, the bandwidth available for synchronization 602 in a communication medium may be divided into a series of non-overlapping frequency sub-bands 604. Each of the non-overlapping frequency sub-bands 604 may be used to carry a separate signal. In the illustrated example of FIG. 6, SS1, SS2, and PSS may each use one of the non-overlapping frequency sub-bands 604.

In an aspect, the SS may be multiplexed with other SS in the SS block 610 such as the PSS. The PSS and SSS may be mapped around the synchronization signal frequency. The SS may be split into two SS, e.g., SS1, SS2. Thus, the SS may be mapped into two neighbor sub-bands of the PSS such that the bandwidth of PSS and SS (SS1+SS2) is equal to the bandwidth of the SSS. Mapping of the SS sequences may be defined such that a UE 104 may identify a sequence and perform a look up in order to arrive at an SS block index. The SS block index may be decoded and used to determine a beam direction.

The frequency-division multiplexed PSS and SS may be time division multiplexed with one or more of the SSS and the PBCHs. In time-division multiplexing, the available time for transmission may be divided into a series of non-overlapping periods 606. In the illustrated example, in a first period 606, a first PBCH is transmitted using the bandwidth available for synchronization 602. In a second period 606, the frequency-division multiplexed PSS and SS is transmitted using the non-overlapping frequency sub-bands 604. One non-overlapping frequency sub-band 604 may be used for each of the SS1, the PSS, and the SS2. In a third period 606, an SSS is transmitted using the bandwidth available for synchronization 602. In a fourth period 606, a second PBCH is transmitted using the bandwidth available for synchronization 602. Such an FDM approach to locating the SS may reduce the number of timing hypotheses to test and thereby facilitate lower PSS detection complexity.

In the diagram, time may increase along the time-axis in the direction of the arrow on the time-axis. Accordingly, the first PBCH may be transmitted, followed by the PSS, the SS1, and the SS2, at the same time using frequency multiplexing. The SSS may follow the PSS, the SS1, and the SS2. The second PBCH may follow the SSS. However, the diagram illustrates only one example of possible time/frequency resource allocation for frequency-division multiplexing of the SS and the PSS. Other orderings, other than the ordering illustrated in the diagram may also be used. Additionally, in the diagram, frequency may increase along the frequency-axis in the direction of the arrow.

In an example, the SS sequence design may be constructed based on PN sequences. Example PN sequences include, but are not limited to M-sequences and Zadoff-Chu sequences. The M-sequence may be a maximum length sequence (MLS). The MLS is a type of pseudorandom binary sequence, the bits of which may be generated using maximal linear feedback shift registers. The Zadoff-Chu sequence is an example of a complex-valued mathematical sequence.

In an example, the SS1 and the SS2 may be cyclic shifts of base PN sequences. A cyclic shift is the operation of rearranging entries in a sequence. Thus, the SS1 and the SS2 may be a rearranged (shifted) version of base PN sequences.

Furthermore, in an aspect, the SS2 may be scrambled by the cyclic shift of SS1. The SS2 may be scrambled by the cyclic shift of SS1 to differentiate different SS indices from the same cell.

In another aspect, the SS1 and the SS2 may be scrambled by the PCI. Scrambling the SS1 and the SS2 using the PCI may allow for differentiating the same SS index from different cells.

In another aspect, the SS block index may be signaled by a combination of cyclic shifts of the SS1 and the SS2.

In an aspect, a determination of a block index based on an identity/root of a PN sequence may be used in a communication system in connection with the PSS and the SSS. A device may recognize a sequence (or an offset to a sequence, or a combination of sequences) and map the recognized sequence identifier to an index value as part of a larger synchronization procedure that includes cell identification and beam information.

The example of FIG. 6 may be less complex than the example of FIG. 7 discussed below because the PSS detection may use a lower sampling rate which may lead to fewer timing hypotheses to test and fewer tests needing to be performed.

In an aspect, having both SS1 and SS2 may provide a larger sequence space than a case having a long SS sequence. A sequence space may be a vector space of real or complex numbers.

Figure 7:
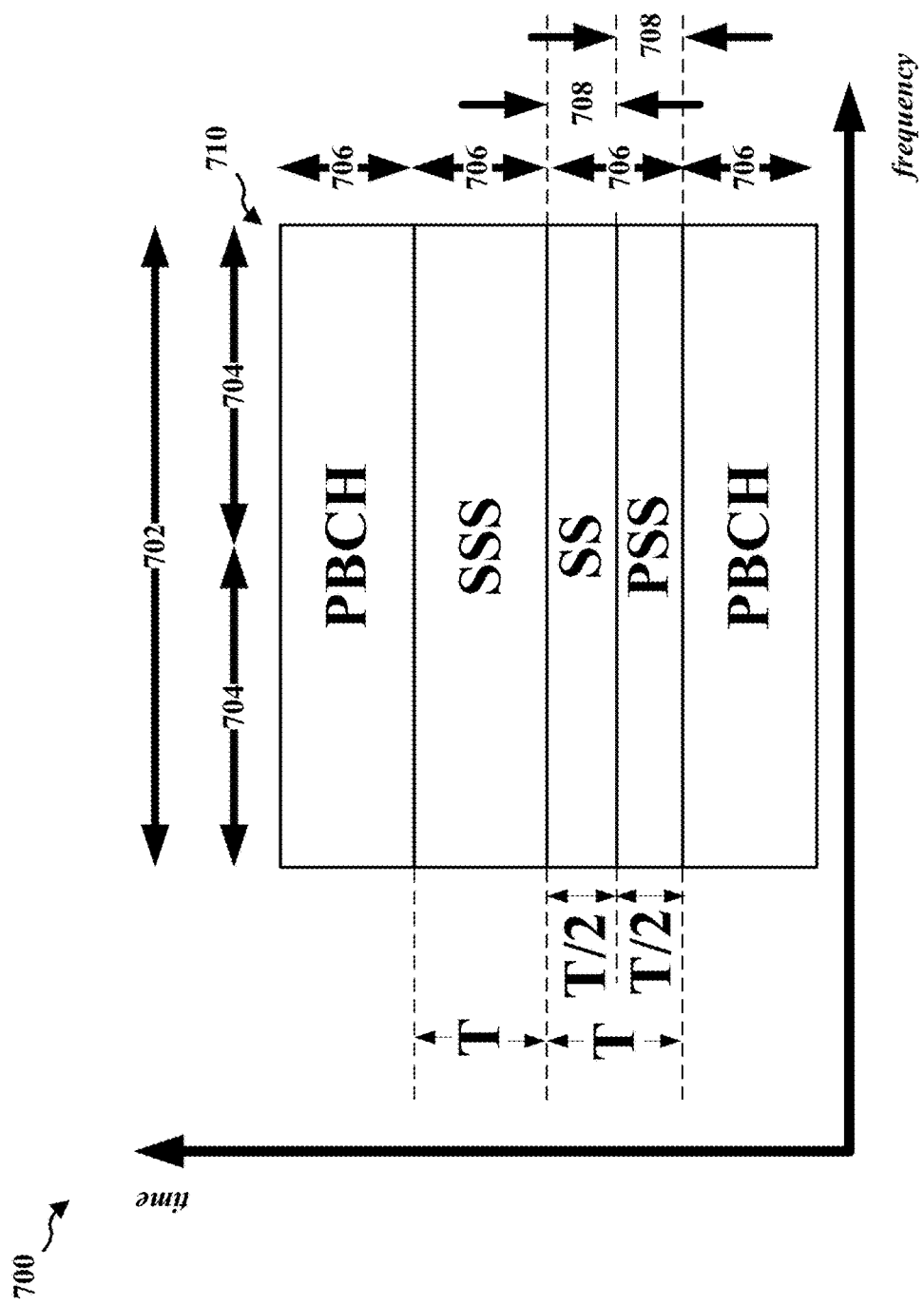
FIG. 7 is a diagram illustrating an example of time-division multiplexing of a SS with other SS in an SS block in accordance with the systems and methods described herein.

FIG. 7 is a diagram illustrating an example of time-division multiplexing 700 of a SS with other SS in an SS block 710 in accordance with the systems and methods described herein. The diagram, illustrating an example of time-division multiplexing 700, is a time/frequency diagram. The time/frequency diagram illustrates an example placement of the PSS, the SSS, the SS, and the two PBCH in time and frequency. Additionally, the PSS, the SSS, the SS, and the two PBCH may be transmitted as part of an SS block 710.

In the example of FIG. 7, the SS may be time-multiplexed with other SS in SS block 710 such as the PSS, the SSS, the SS, and the two PBCHs. In time-division multiplexing, the available time for transmission may be divided into a series of non-overlapping periods 706, 708. In the illustrated example, in a first period 706, a first PBCH is transmitted using the bandwidth available for synchronization 702. In a second period 708, the PSS is transmitted using the bandwidth available for synchronization 702. If the first time period 706 is a time period, t, the second period 708 may be a time period, t/2. In a third period 708, the SS is transmitted using the bandwidth available for synchronization 702. In a fourth period 706, an SSS is transmitted using the bandwidth available for synchronization 702. In a fifth period 706, a second PBCH is transmitted using the bandwidth available for synchronization 702. In the example of FIG. 7, four OFDM symbols (4T) may be used.

In another example, five OFDM symbols (5T) may be used. For example, the first PBCH, SSS, SS, PSS, and the second PBCH may all span a period, T. In other words, SS and PSS may span the same period as PBCH and SSS.

In the diagram, time may increase along the time-axis in the direction of the arrow on the time-axis. Accordingly, the first PBCH may be transmitted, followed by the PSS and then the SS. The SSS may follow the SS. The second PBCH may follow the SSS. However, the diagram illustrates only one example of a possible time/frequency resource allocation for time-division multiplexing. Other orderings, other than the ordering illustrated in the diagram may also be used. Additionally, in the diagram, frequency may increase along the frequency-axis in the direction of the arrow.

In an aspect, the SS and the PSS may be time-division multiplexed in a split symbol. The SS may be multiplexed with other SS in the SS block 710. The SS and the PSS may be time-division multiplexed so that the SS and the PSS have the same numerology. In other words, the SS and the PSS may have the same subcarrier spacing and cyclic prefix. The SS and the PSS may include a scaled numerology of other SS symbols (e.g., SSS and PBCH) in the SS block 710. For example, the subcarrier spacing and cyclic prefix may be scaled from other SS symbols. In an example, a subcarrier spacing of the SS and the PSS may be 60 kHz while the subcarrier spacing of the SSS and the PBCH may be 30 kHz. While potentially increasing SS detection complexity, the split symbol approach may support better timing resolution than the FDM approach shown in FIG. 6 due to the wider bandwidth of PSS and correspondingly higher sampling rate.

In an aspect, the SS may be constructed based on cyclic shifts of PN sequences e.g., M-sequence or Zadoff-Chu sequences. Accordingly, the SS block index may be signaled by cyclic shifts.

In an aspect, the SS may be a frequency division multiplexed version of the SS1 and the SS2. In frequency-division multiplexing, the available bandwidth available for synchronization 702 in a communication medium may be divided into a series of non-overlapping frequency sub-bands 704. Each of the non-overlapping frequency sub-bands 704 may be used to carry a separate signal. For example, in the illustrated example of FIG. 7, SS1 and SS2 may each use one of the non-overlapping frequency sub-bands 704. In an aspect, the SS1 and SS2 design may be similar to the SS1 and SS2 designs described with respect to FIG. 7.

In an aspect, the SS may be scrambled by a PCI. The SS may be scrambled by the PCI to differentiate the same SS index from different cells.

In an aspect, the example may use one OFDM symbol for each of the PSS, the SSS, the SS and each of the two PBCH that are time-division multiplexed. The slide subcarrier spacing of SS and PSS may be double of the subcarrier spacing of the SSS and the PBCH. In another aspect, all of the PSS, the SSS, the SS and both of the PBCHs may have the same numerology and may use 5 OFDM symbols.

In an aspect, the cyclic shifts of the PN sequences may be used to signal SS block indices. For example, FIG. 7 illustrates two short sequences SS1 and SS2. Assuming that the SS1 is associated with a first base sequence of length N and SS2 is associated with a second base sequence of length N, theoretically there may be N*N combinations to be used for signaling the SS block indices.

The design of FIG. 7 may have a higher PSS detection complexity. However, the design of FIG. 7 may provide improved timing resolution relative to the design of FIG. 6. Additionally, the design of FIG. 7 may provide improved timing resolution due to a higher sampling rate. The PSS used in the design of FIG. 7 may have a wider bandwidth than the PSS used in the design of FIG. 6. For example, the PSS illustrated in FIG. 6 may be ⅓ the width of the PSS illustrated in FIG. 7 (assuming a case when each example uses the same total bandwidth).

Figure 8:
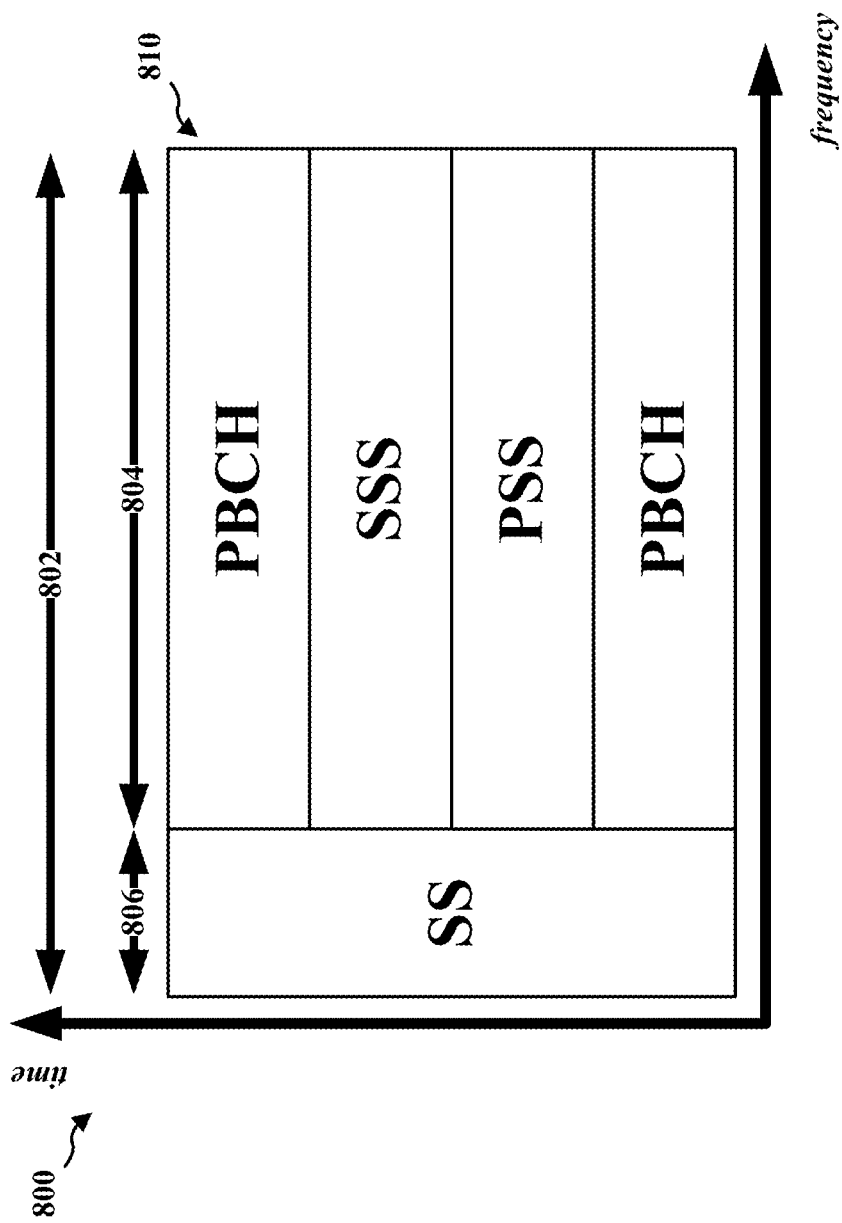
FIG. 8 is a diagram illustrating an example of frequency-division multiplexing of a SS with other SS in an SS block in accordance with the systems and methods described herein.

FIG. 8 is a diagram illustrating an example of frequency-division multiplexing 800 of a SS with other SS in an SS block 810 in accordance with the systems and methods described herein. The diagram, illustrating an example of frequency-division multiplexing 800, is a time/frequency diagram. The time/frequency diagram illustrates an example placement of the PSS, the SSS, the SS, the PSS, and the PBCH (two PBCHs) in time and frequency. The PSS, the SSS, the SS, the PSS, and the PBCH (two PBCHs) may be transmitted as part of an SS block 810.

In the example of FIG. 8, the SS is frequency-division multiplexed with both of the PBCHs, the PSS, and the SSS. In frequency-division multiplexing, the bandwidth available for synchronization signals in a communication medium 802 may be divided into a series of non-overlapping frequency sub-bands 804, 812. Each of the non-overlapping frequency sub-bands 804, 806 may be used to carry a separate signal.

For example, in the illustrated example of FIG. 8, the non-overlapping frequency sub-band 804 may be used to transmit the PSS, the SSS, and both PBCHs. The non-overlapping frequency sub-band 804 may be used to transmit the PSS, the SSS, and both PBCHs. The non-overlapping frequency sub-band 806 may be used to transmit the SS. The SS may be frequency-multiplexed with each of the other SS in an SS block 810.

In the diagram, time may increase along the time-axis in the direction of the arrow on the time-axis. Accordingly, the first PBCH may be transmitted, followed by the PSS, the SSS, and the second PBCH. At the same time as each of the first PBCH, the PSS, the SSS, and the second PBCH, on the non-overlapping frequency sub-band 806, the SS may be transmitted. In other words, the SS may be transmitted on a separate frequency from the first PBCH, the PSS, the SSS, and the second PBCH over a period of time that includes the transmissions of the first PBCH, the PSS, the SSS, and the second PBCH. Accordingly, the SS/PBCH-demodulation reference signal (DMRS) may be frequency division with the SSS and may cover the full bandwidth of the SS block. The diagram illustrates only one example of a possible time/frequency resource allocation for frequency-division multiplexing of the SS and the other synchronization signals, however. Other orderings, other than the ordering illustrated in the diagram may also be used.

In an aspect, the SS and other SS may be frequency-division multiplexed. For example, the SS may be frequency-division multiplexed with other SS in the SS block 810. The SS may be frequency-division multiplexed with all or a subset of the PSS, the SSS and both of the PBCH symbols within an SS block 810. For example, in an aspect, the SS may be multiplexed with the SSS, the PSS, or both the SSS and the PSS. The SS may include one or multiple OFDM symbols.

In an aspect, the SS may be constructed based on cyclic shifts of PN sequences e.g., M-sequence or Zadoff-Chu sequences, as discussed above. When the SS uses multiple OFDM symbols, the SS sequences in different symbols may be identical or different. In an aspect, when the SS sequences are different in different symbols, the combination of cyclic shifts associated with the SS sequences may be used to signal the SS block index.

In an aspect, the SS may be scrambled by the PCI. The SS may be scrambled by PCI to differentiate the same SS index from different cells.

Figure 9:
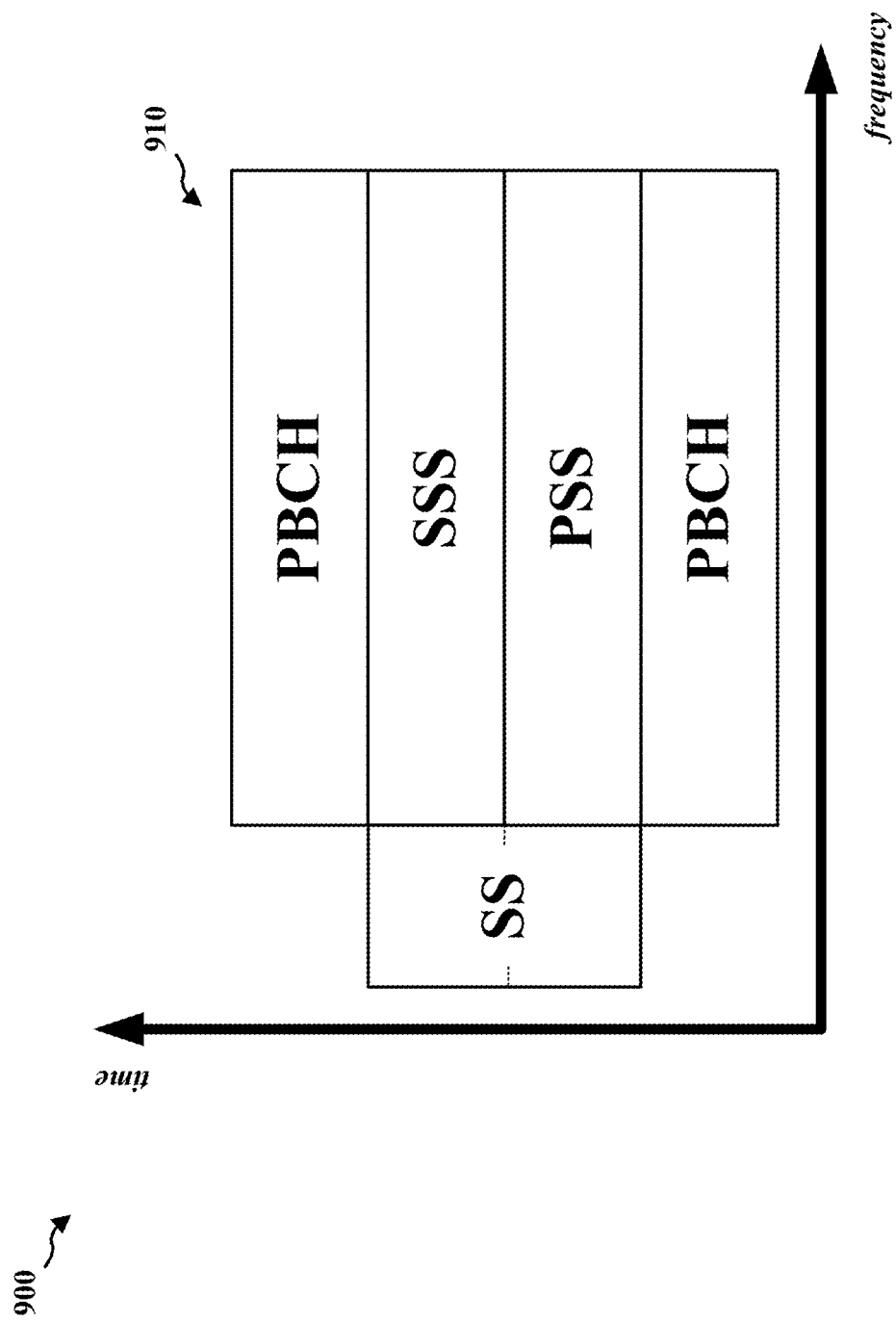
FIG. 9 is a diagram illustrating another example of frequency-division multiplexing of a SS with other SS in an SS block in accordance with the systems and methods described herein.

As discussed above, the SS may be used to signal SS block indices. FIG. 9 is a diagram illustrating an example of frequency-division multiplexing 900 of a signal comprising synchronization signal (SS) block index information with other SS in an SS block 910 in accordance with the systems and methods described herein. FIG. 9 illustrates one example in which the signal comprising the SS block index information may be referred to as a SS. The diagram of FIG. 9 is generally similar to the diagram of FIG. 8. Unlike the diagram of FIG. 8, however, which illustrates frequency-division multiplexing of the signal comprising SS block index information with each of the first PBCH, the PSS, the SSS, and the second PBCH, the diagram of FIG. 9, illustrates that the signal comprising SS block index information may be frequency multiplexed with fewer than all of the other synchronization signals, e.g., the PSS, the SSS, or both the PSS and the SSS. Accordingly, the SS/PBCH-DMRS may be frequency division with the SSS and may cover less than the full bandwidth of the SS block. For example, the diagram of FIG. 9 illustrates frequency-division multiplexing of the signal comprising SS block index information with the PSS and the SSS (and not the PBCHs). Furthermore, unlike FIG. 6, in the diagram of FIG. 9, the bandwidth of the frequency-division multiplexed PSS and SSS is the same as the bandwidth of the PBCHs, which are not frequency-division multiplexed. The term SS is only one example of a signal that may comprise the SS block index information. In other examples, the SS is not used to describe the block that caries the SS block indices. For example, the term PBCH may be used to describe the block that caries the SS block indices.

Figure 10:
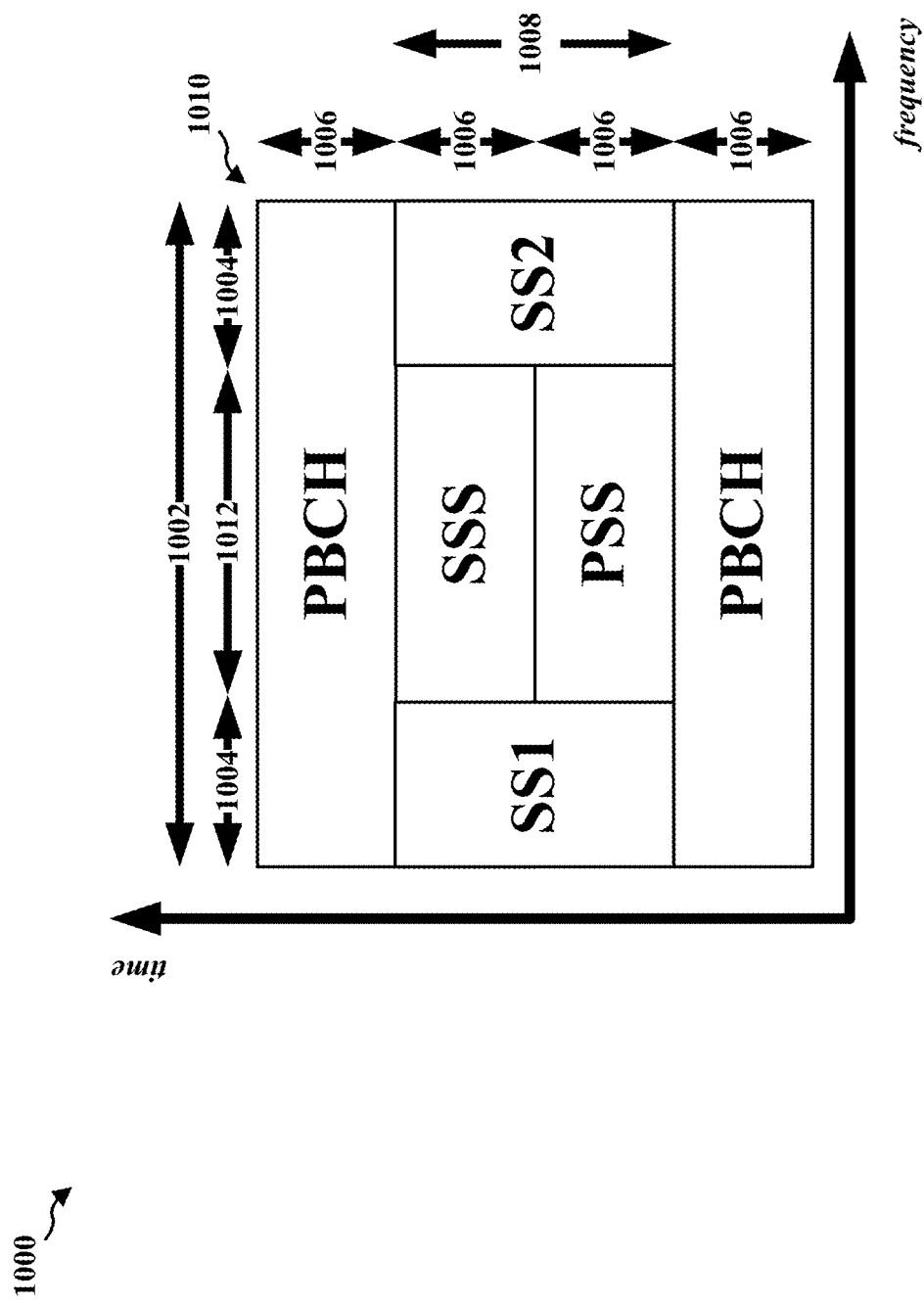
FIG. 10 is a diagram illustrating another example of frequency-division multiplexing of a SS with other SS in an SS block in accordance with the systems and methods described herein.

FIG. 10 is a diagram illustrating another example of frequency-division multiplexing of a SS with other SS in an SS block in accordance with the systems and methods described herein. As shown, SS1 and SS2 can be separate, short PN sequences or parts of a larger PN sequence. The diagram, illustrating an example of frequency-division multiplexing 1000, is a time/frequency diagram. The time/frequency diagram illustrates an example placement of the PSS, the SSS, the SS (SS1, SS2), and the PBCH (two PBCHs) in time and frequency. The PSS, the SSS, the SS, and the PBCH (two PBCHs) may be transmitted as part of an SS block 1010. In an example of short sequence design: SS1 and SS2 may be constructed from PN sequences of length 31 (e.g., assuming SS can occupy 62 REs).

In the example of FIG. 10, SS1 and SS2 are frequency-division multiplexed with both of the PSS, and the SSS. In frequency-division multiplexing, the bandwidth available for synchronization signals in a communication medium 1002 may be divided into a series of non-overlapping frequency sub-bands 1004, 1012. Each of the non-overlapping frequency sub-bands 1004, 1012 may be used to carry a separate signal. For example, in the illustrated example of FIG. 10, the non-overlapping frequency sub-bands 1012 may be used to transmit the PSS, the SSS. The bandwidth available for synchronization 1002 may be used to transmit both PBCHs. The non-overlapping frequency sub-band 1004 may be used to transmit SS1 and SS2. PBCH, PSS, and SSS may be time multiplexed in periods 1006, while SS1 and SS2 may span two periods 1006 for a total period 1008. Thus, in the illustrated example, PSS and SSS are time division multiplexed with each other; PSS and SSS are frequency division multiplexed with SS1 and SS2; and PBCH is time division multiplexed with SS1/SS2/PSS/SSS.

In the diagram, time may increase along the time-axis in the direction of the arrow on the time-axis. Accordingly, the first PBCH may be transmitted, followed by the PSS and then SSS, and then the second PBCH (in the illustrated example). At the same time as the PSS and then SSS, the non-overlapping frequency sub-band 1004 may be used to transmit SS1 and SS2. In other words, SS1 and SS2 may be transmitted on a separate frequency from the PSS and the SSS at the same period of time. The diagram illustrates only one example of a possible time/frequency resource allocation for frequency-division multiplexing of the SS and the other synchronization signals, however. Other orderings, other than the ordering illustrated in the diagram may also be used.

In an aspect, the PSS and the SSS may have the same bandwidth. The PBCH may have a wider bandwidth than the PSS and the SSS.

In an aspect, the SS may be frequency division multiplexed with the PSS and/or the SSS. The SS may be frequency division multiplexed with the PSS and/or the SSS such that bandwidth of (SS+PSS) is equal to bandwidth of PBCH.

In an aspect, the bandwidth of (SS+SSS) is equal to bandwidth of PBCH.

In an aspect, the SS may include two short PN sequences, SS1 and SS2, or SS may be a long PN sequence (which may be an upper neighbor subband or a lower neighbor subband of the PSS and the SSS).

In an aspect, a numerology of the SS may be identical to the numerology of the PSS and/or the SSS.

In an aspect, both the SS and the SSS may be used as a DMRS for PBCH.

In an aspect, the SS is frequency division multiplexed with the PSS and the SSS in the same set of OFDM symbols.

In an aspect, the SS comprises a first SS and a second SS. For example, the SS may be made up of two short sequences. In another aspect, the SS may be a single long sequence.

In an aspect, the SS, the PSS, and the SSS are time division multiplexed with the PCSH.

Figure 11:
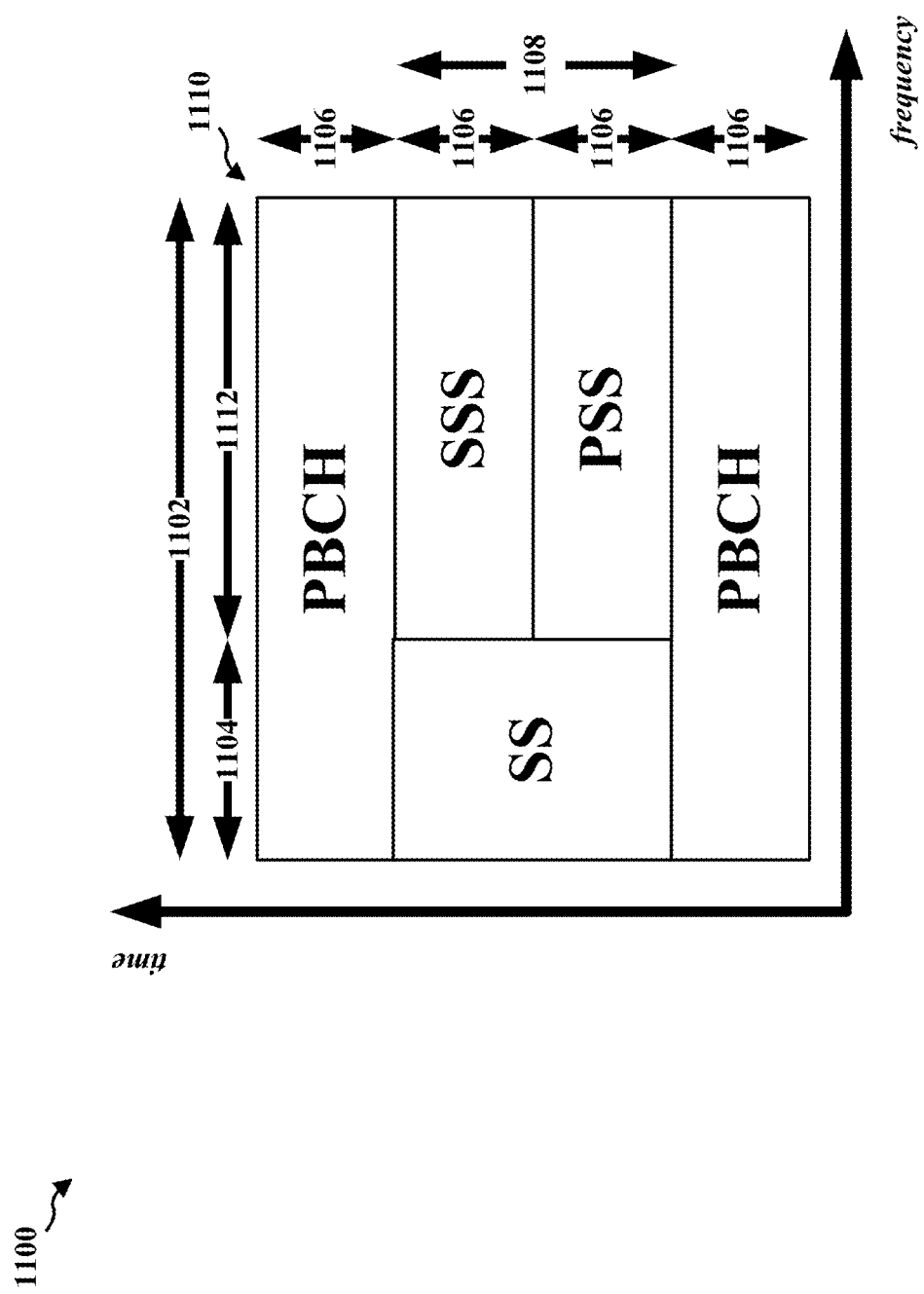
FIG. 11 is a diagram illustrating another example of frequency-division multiplexing of a SS with other SS in an SS block in accordance with the systems and methods described herein.

FIG. 11 is a diagram illustrating another example of frequency-division multiplexing of a SS with other SS in an SS block in accordance with the systems and methods described herein. As shown, SS may be part of a larger PN sequence or may be separate, short PN sequences. The diagram, illustrating an example of frequency-division multiplexing 1100, is a time/frequency diagram. The time/frequency diagram illustrates an example placement of the PSS, the SSS, the SS, the PSS, and the PBCH (two PBCHs) in time and frequency. The PSS, the SSS, the SS, and the PBCH (two PBCHs) may be transmitted as part of an SS block 1110. In an example of a long sequence design, an SS may be constructed from PN sequences of length 61 (e.g., assuming SS can occupy 62 REs, e.g., with one tone zero RE).

In the example of FIG. 11, SS is frequency-division multiplexed with both of the PSS, and the SSS. In frequency-division multiplexing, the bandwidth available for synchronization signals in a communication medium 1102 may be divided into a series of non-overlapping frequency sub-bands 1104, 1112. Each of the non-overlapping frequency sub-bands 1104, 1112 may be used to carry a separate signal. For example, in the illustrated example of FIG. 11, the non-overlapping frequency sub-band 1104 may be used to transmit the SS. The non-overlapping frequency sub-band 1112 may be used to transmit both PSS and SSS. The bandwidth available for synchronization 1102 may be used to transmit the PBCHs (time division multiplexed). The PBCHs may be time division multiplexed with the SS/PSS/SSS over time periods 1106. The SS may use two time periods 1106 (a time 1108).

In the diagram, time may increase along the time-axis in the direction of the arrow on the time-axis. Accordingly, the first PBCH may be transmitted, followed by the PSS and then SSS, and the second PBCH. At the same time as the PSS and then SSS, the non-overlapping frequency sub-band 1104 may be used to transmit SS across time periods used by PSS and SSS in the other frequency sub-band 1112. In other words, SS may be transmitted on a separate frequency from the PSS and the SSS during the same two periods of time (with PSS and SSS each using one time period 1106). The diagram illustrates only one example of a possible time/frequency resource allocation for frequency-division multiplexing of the SS and the other synchronization signals, however. Other orderings, other than the ordering illustrated in the diagram may also be used.

In an aspect, the SS is frequency division multiplexed with the PSS and the SSS in the same set of OFDM symbols.

In an aspect, the SS comprises a first SS and a second SS. For example, the SS may be made up of two short sequences. In another aspect, the SS may be a single long sequence.

In an aspect, the SS, the PSS, and the SSS are time division multiplexed with the PCSH.

FIGS. 6-11 illustrate specific examples of multiplexing a SS with at least one of a PSS, an SSS, or a PBCH for transmission in an SS block. It will be understood, however, that other combinations of multiplexing a SS with at least one of a PSS, an SSS, or a PBCH for transmission in an SS block are also possible.

Figure 12:
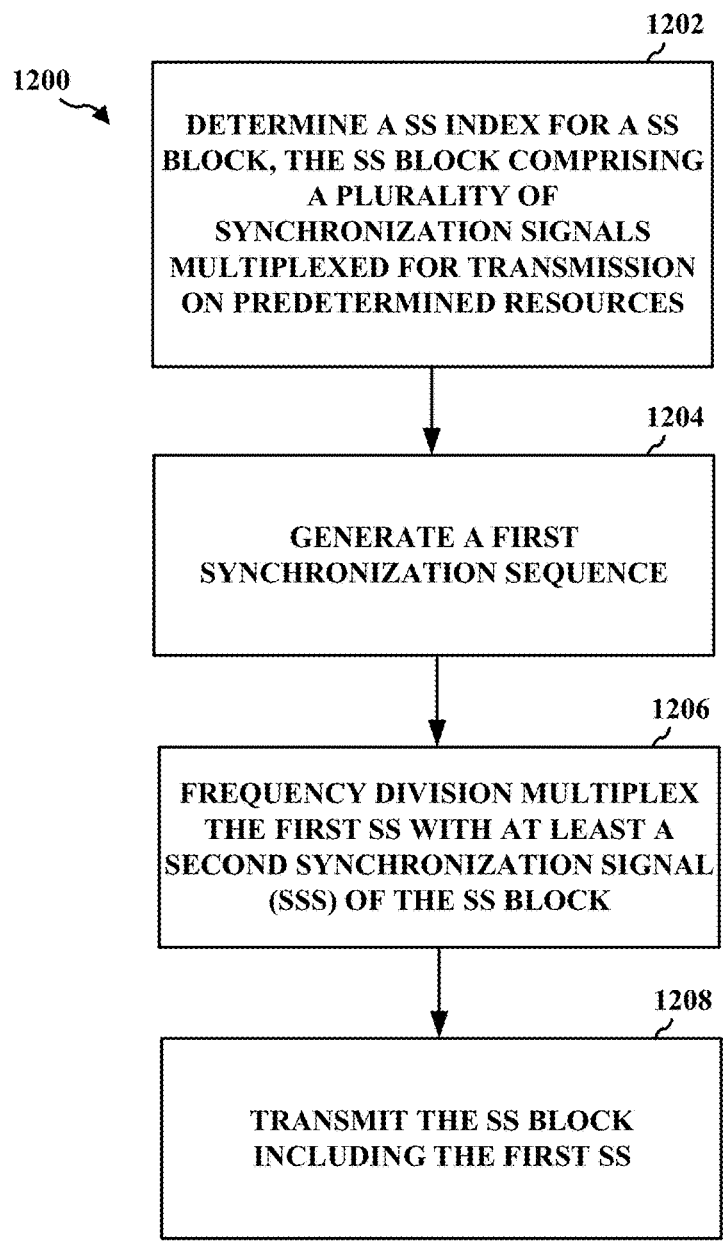
FIG. 12 is a flowchart of a method of wireless communication in accordance with the systems and methods described herein.

FIG. 12 is a flowchart 1200 of a method of wireless communication in accordance with the systems and methods described herein. The method may be performed by an eNB/gNB (e.g., the eNB/gNB 102, 180, 310, 402, 1650, the apparatus 1402, 1402') communicating with a UE (e.g., UE 104, 350, 404, 1450, the apparatus 1602, 1602'). At block 1202, the eNB/gNB determines a SS index for a SS block, the SS block comprising a plurality of synchronization signals multiplexed for transmission on predetermined resources. For example, the eNB/gNB (102, 310, 402) determines a SS index for a SS block, the SS block comprising a plurality of synchronization signals multiplexed for transmission on predetermined resources (FIG. 9). Determining a SS index for a SS block, the SS block comprising a plurality of synchronization signals multiplexed for transmission on predetermined resources may include one or more of determining a plurality of synchronization signals, multiplexing for transmission on predetermined resources.

At block 1204, the eNB/gNB generates a first SS of the plurality of synchronization signals based at least in part on the SS index. For example, the eNB/gNB (102, 310, 402) generates a first SS of the plurality of synchronization signals based at least in part on the SS index (FIG. 9). Generating a first SS of the plurality of synchronization signals based at least in part on the SS index may include one or more of selecting a SS of a plurality of synchronization signals and applying the SS index to the SS.

At block 1206, the eNB/gNB frequency division multiplexes the first SS with at least a SSS of the SS block, wherein the SSS comprises a secondary synchronization signal that carries information about a physical layer cell identity group number for the base station. For example, the eNB/gNB (102, 310, 402) frequency division multiplexes the first SS with at least a SSS of the SS block, wherein the SSS comprises a secondary synchronization signal that carries information about a physical layer cell identity group number for the base station (FIG. 9). Frequency division multiplexing the SS with at least a SSS may include determining information about a physical layer cell identity group number, determining a radio frame timing information for the base station, and frequency division multiplexing the SS with at least a SSS. In an aspect, the SSS may also carry radio frame timing information.

At block 1208, the eNB/gNB transmits the first SS block including the SS generated based at least in part on the SS block identifier frequency division multiplexed with the SSS on the predetermined resources. For example, the eNB/gNB (102, 310, 402) transmits the first SS block including the SS generated based at least in part on the SS block identifier frequency division multiplexed with the SSS on the predetermined resources (910, FIG. 9). Transmitting the SS block, the SS generated based at least in part on the SS block identifier frequency division multiplexed with the SSS on the predetermined resources may include one or more of determining the SS block identifier, determining the SSS, and providing the SS block to a transmitter.

In an aspect, the SS may include a first SS ("SS1" FIG. 6, FIG. 10) and a second SS ("SS2" FIG. 6, FIG. 10) Additionally, the SS of FIG. 7 may also be split in to multiple SS.

In an aspect, the eNB/gNB may generate a first synchronization sequence for the first SS based on a first PN sequence. For example, the eNB/gNB (102, 310, 402) generates a first synchronization sequence (e.g., a series of bits) for the first SS (e.g., "SS1" FIG. 6, FIG. 10 and a first portion of "SS" FIG. 7, FIG. 11) based on a first PN sequence.

In an aspect, the eNB/gNB may generate a second synchronization sequence for the second SS based on a second PN sequence. For example, the eNB/gNB (102, 310, 402) generates a second synchronization sequence (e.g., a series of bits) for the second SS ("SS2" FIG. 6, FIG. 10 a second portion of "SS" FIG. 7, FIG. 11) based on a first PN sequence.

In an aspect, the eNB/gNB may cyclic shift the first PN sequence based on a first cyclic shift to generate the first synchronization sequence. For example, the eNB/gNB (102, 310, 402) cyclic shifts the first PN sequence based on a first cyclic shift to generate the first synchronization sequence.

In an aspect, the eNB/gNB may cyclic shift the second PN sequence based on a second cyclic shift to generate the second synchronization sequence. For example, the eNB/gNB (102, 310, 402) cyclic shifts the second PN sequence based on a second cyclic shift to generate the second synchronization sequence.

In an aspect, the SS2 can be scrambled by the cyclic shift of SS1. Alternatively, in another aspect the SS may be a single, long sequence which may be chopped into two parts for SS1 and SS2.

Accordingly, some examples may have one PN sequence (long). Other examples may use two PN sequences (short). For an example including a second PN sequence, the second PN sequence may be separately be scrambled by a cyclic shift of SS1 to enhance orthogonality.

In an aspect, the eNB may scramble the second synchronization sequence using the first cyclic shift. For example, the eNB/gNB (102, 310, 402) scrambles the second synchronization sequence using the first cyclic shift.

In an aspect, the eNB/gNB may scramble the first synchronization sequence and the second synchronization sequence based on a PCI of the base station. For example, the eNB/gNB (102, 310, 402) scrambles the first synchronization sequence and the second synchronization sequence based on the PCI of the base station (e.g., eNB/gNB).

In an aspect, the eNB/gNB may determine a block index for the SS block. For example, the eNB/gNB (102, 310, 402) determines a block index for the SS block (610, 710, 810, 910, 1010, 1110).

In an aspect, the eNB/gNB may determine the first cyclic shift and the second cyclic shift based on the block index. For example, the eNB/gNB (102, 310, 402) determines the first cyclic shift and the second cyclic shift based on the block index.

In an aspect, the SS may be frequency division multiplexed in a same OFDM symbol with the PSS.

In an aspect, the SS may include a first SS and a second SS, and the first SS, the second SS, and the PSS are frequency division multiplexed in the same OFDM symbol.

In an aspect, the PSS may be between the first SS and the second SS in frequency.

In an aspect, the PSS, the first SS, and the second SS together may occupy a same number of RBs in the SS block as the SSS.

In an aspect, the same number of RBs is x, the PSS occupies x/2 RBs, the first SS occupies x/4 RBs, and the second SS occupies x/4 RBs.

In an aspect, the SS may be time division multiplexed with the PSS, the SSS, and the PBCH in a same set of subcarriers.

In an aspect, the subcarrier spacing of the SSS and the PBCH is x kHz and the subcarrier spacing of the SS and the PSS is 2x kHz.

In an aspect, the subcarrier spacing of the SSS, the PBCH, the SS, and the PSS may be the same.

In an aspect, OFDM symbol time length for SS and PSS are each 1/2x ms, and OFDM symbol time length for SSS and PBCH are each 1/x ms.

In an aspect, the SS may include a first SS and a second SS, and the first SS and the second SS are frequency division multiplexed in a same OFDM symbol.

In an aspect, the SS and the PSS may be transmitted with a first cyclic prefix, and the SSS and the PBCH are transmitted with a second cyclic prefix different from the first cyclic prefix.

In an aspect, the SS may be frequency division multiplexed with at least one of the PSS, the SSS, or the PBCH in the same set of OFDM symbols.

In an aspect, the SS is frequency division multiplexed with the PSS, the SSS, and the PBCH in the same set of OFDM symbols.

In an aspect, the SS may be frequency division multiplexed with the PSS and the SSS in the same set of OFDM symbols.

In an aspect, the SS is frequency division multiplexed with the PSS and the SSS in the same set of OFDM symbols.

In an aspect, the SS frequency division multiplexed with the PSS and the SSS includes a first SS and a second SS.

In an aspect, the SS, the PSS, and the SSS are time division multiplexed with the PCSH.

Figure 13:
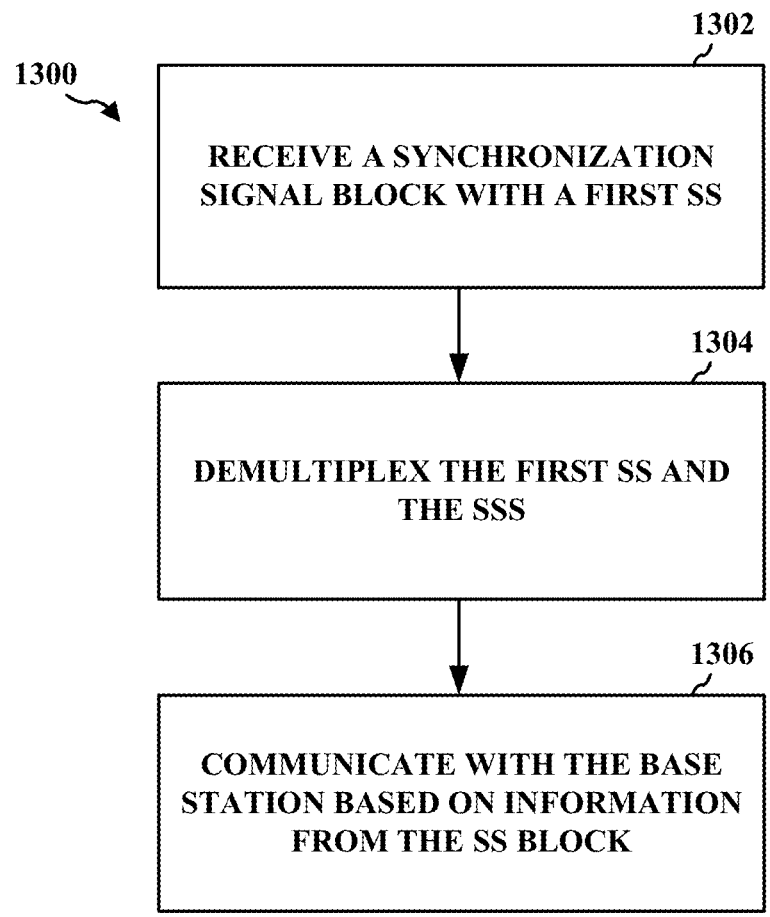
FIG. 13 is a flowchart of a method of wireless communication in accordance with the systems and methods described herein.

FIG. 13 is a flowchart 1300 of a method of wireless communication in accordance with the systems and methods described herein. The method may be performed by a UE (e.g., the UE 104, 350, 404, 1450, the apparatus 1602, 1602') such as part of an initial acquisition procedure in which the UE performs cell identification, acquires frame timing, etc. At block 1302, the UE receives a synchronization signal block with a first SS comprising a first index for the SS block frequency division multiplexed with a second synchronization signal (SSS) on predetermined resources, wherein the SSS carries information about a physical layer cell identity group number for a base station. For example, the UE (e.g., the UE 104, 350, 404, 1450, the apparatus 1602, 1602') receives a synchronization signal block with a first SS comprising a first index for the SS block frequency division multiplexed with a SSS on predetermined resources, wherein the SSS carries information about a physical layer cell identity group number for a base station. Receiving a synchronization signal block may include one or more of receiving signals and extracting the synchronization signal block.

At block 1304, the UE demultiplexes the first SS and the SSS and obtaining the SS index and the information about the physical layer cell identity group number for the base station. For example, the UE (e.g., the UE 104, 350, 404, 1450, the apparatus 1602, 1602') demultiplexes the first SS and the SSS and obtaining the SS index and the information about the physical layer cell identity group number for the base station. Demultiplexing the SS and the SSS to obtain the information about a physical layer cell identity group number and radio frame timing information for a base station may include processing the SS and the SSS and extracting the information about a physical layer cell identity group number and radio frame timing information.

At block 1306, the UE communicates with the base station based on information from the SS block. For example, the UE (e.g., the UE 104, 350, 404, 1450, the apparatus 1602, 1602') communicates with the base station based on the information from the SS block. Communicating with the base station based on the information may include one or more of generating signals to communicate with the base station and transmitting the signals.

In an aspect, the UE 104, 350, 404 determines the first cyclic shift and the second cyclic shift and determining a block index of the SS block based on the determined first cyclic shift and the determined second cyclic shift.

In an aspect, the SS may include a first SS corresponding to a first synchronization sequence and a second SS corresponding to a second synchronization sequence.

In an aspect, the first synchronization sequence may be based on a first PN sequence.

In an aspect, the second synchronization sequence may be based on a second PN sequence.

In an aspect, the first synchronization sequence may be a first cyclic shift of the first PN sequence.

In an aspect, the second synchronization sequence may be a second cyclic shift of the second PN sequence.

In an aspect, a UE may descramble the second synchronization sequence based on the first cyclic shift.

In an aspect, a UE may descramble the first synchronization sequence and the second synchronization sequence based on a physical cell identifier (PCI) received from a base station.

In an aspect, a UE may determine the first cyclic shift and the second cyclic shift.

In an aspect, a UE may determine a block index of the SS block based on the determined first cyclic shift and the determined second cyclic shift.

In an aspect, the SS may be frequency division multiplexed in a same OFDM symbol with the PSS.

In an aspect, the SS may include a first SS and a second SS, and the first SS, the second SS, and the PSS are frequency division multiplexed in the same OFDM symbol.

In an aspect, the PSS may be between the first SS and the second SS in frequency.

In an aspect, the PSS, the first SS, and the second SS together may occupy a same number of resources blocks (RBs) in the SS block as the SSS.

In an aspect, the same number of RBs is x, the PSS occupies x/2 RBs, the first SS occupies x/4 RBs, and the second SS occupies x/4 RBs.

In an aspect, the SS may be time division multiplexed with the PSS, the SSS, and the PBCH in a same set of subcarriers.

In an aspect, the subcarrier spacing of the SSS and the PBCH is x kHz and the subcarrier spacing of the SS and the PSS is 2x kHz.

In an aspect, the subcarrier spacing of the SSS, the PBCH, the SS, and the PSS may be the same.

In an aspect, OFDM symbol time length for SS and PSS are each 1/2x ms, and OFDM symbol time length for SSS and PBCH are each 1/x ms.

In an aspect, the SS may include a first SS and a second SS, and the first SS and the second SS are frequency division multiplexed in a same OFDM symbol.

In an aspect, the SS and the PSS have a first cyclic prefix, and the SSS and the PBCH have a second cyclic prefix different from the first cyclic prefix.

In an aspect, the SS may be frequency division multiplexed with at least one of the PSS, the SSS, or the PBCH in the same set of OFDM symbols.

In an aspect, the SS may be frequency division multiplexed with the PSS, the SSS, and the PBCH in the same set of OFDM symbols.

In an aspect, the SS may be frequency division multiplexed with the PSS and the SSS in the same set of OFDM symbols.

In an aspect, the cyclic shifts of PN sequences may be used to signal SS block indices. The example discussed with respect to FIG. 6 may include two short sequences SS1 and SS2. Assuming SS1 is associated with base sequence 1 of length N and SS2 is associated with base sequence 2 of length N, there may be N*N combinations that may be used for signaling SS block indices.

Mapping of SS sequences may be defined in a standard such that a UE may identify the sequence and may perform a lookup in order to arrive at the SS block index, (e.g., determining a slot index value based on a sequence, shift, of the SS).

In an aspect, NR/5G PSS/SSS may have the same roles as LTE PSS/SSS. A UE may first detect a PSS/SSS and then decode an SS to obtain an SS block index.

The example described with respect to FIG. 7 may have a higher PSS detection complexity. However, the example described with respect to FIG. 7 may provide better timing resolution due to higher sampling rate (PSS has wider bandwidth than PSS in the example described with respect to FIG. 6).

The example described with respect to FIG. 6 may be less complex than the example described with respect to FIG. 7 in PSS detection due to lower sampling rate which may lead to a lower number of timing hypotheses to test.

Having SS1 and SS2 may provide larger sequence space (e.g., N*N example above) than the case having a long SS sequence.

The example discussed with respect to FIG. 6 may be a more attractive option than the examples described with respect to FIGS. 7-9.

In an aspect, the SS is frequency division multiplexed with the PSS and the SSS in the same set of OFDM symbols.

In an aspect, the SS frequency division multiplexed with the PSS and the SSS includes a first SS and a second SS.

In an aspect, the SS, the PSS, and the SSS are time division multiplexed with the PCSH.

Figure 14:
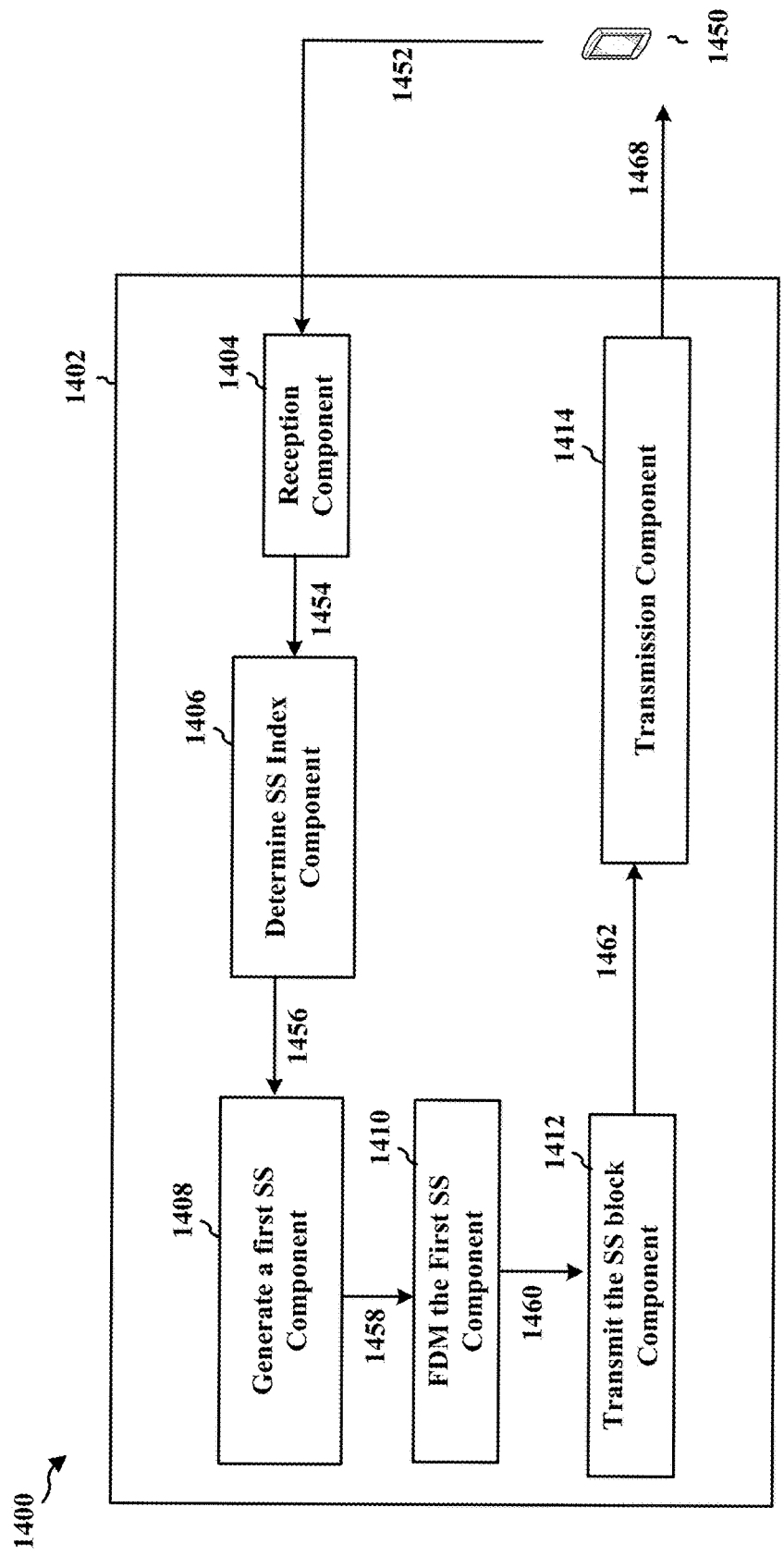
FIG. 14 is a conceptual data flow diagram illustrating the data flow between different means/components in an exemplary apparatus.

FIG. 14 is a conceptual data flow diagram 1400 illustrating the data flow between different means/components in an exemplary apparatus 1402. The apparatus may be a base station. The apparatus includes a component 1404 that receives signals (1452) from a UE 1450. The signals may include an SS block including a SS multiplexed with at least one of a PSS, an SSS, or a PBCH. The apparatus includes a component 1406 that determines a SS index for a SS block, the SS block comprising a plurality of synchronization signals multiplexed for transmission on predetermined resources from signal (1454), a component 1408 that generates a first SS (1458) of the plurality of synchronization signals based at least in part on the SS index based on a signal (1456), and a component 1410 that frequency division multiplexes the first SS (1460) with at least a SSS of the SS block. The SSS comprises a secondary synchronization signal that carries information about a physical layer cell identity group number for the base station. The apparatus includes a component 1412 transmits the first SS block including the SS generated (1462) based at least in part on the SS block identifier frequency division multiplexed with the SSS on the predetermined resources. For example, the component 1412 may cause the transmission component 1414 to transmits signals (1468) including signals that include the SS block including the SS generated based at least in part on the SS block identifier frequency division multiplexed with the SSS on the predetermined resources.

The apparatus may include additional components that perform each of the blocks of the algorithm in the aforementioned flowcharts of FIG. 12. As such, each block in the aforementioned flowcharts of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
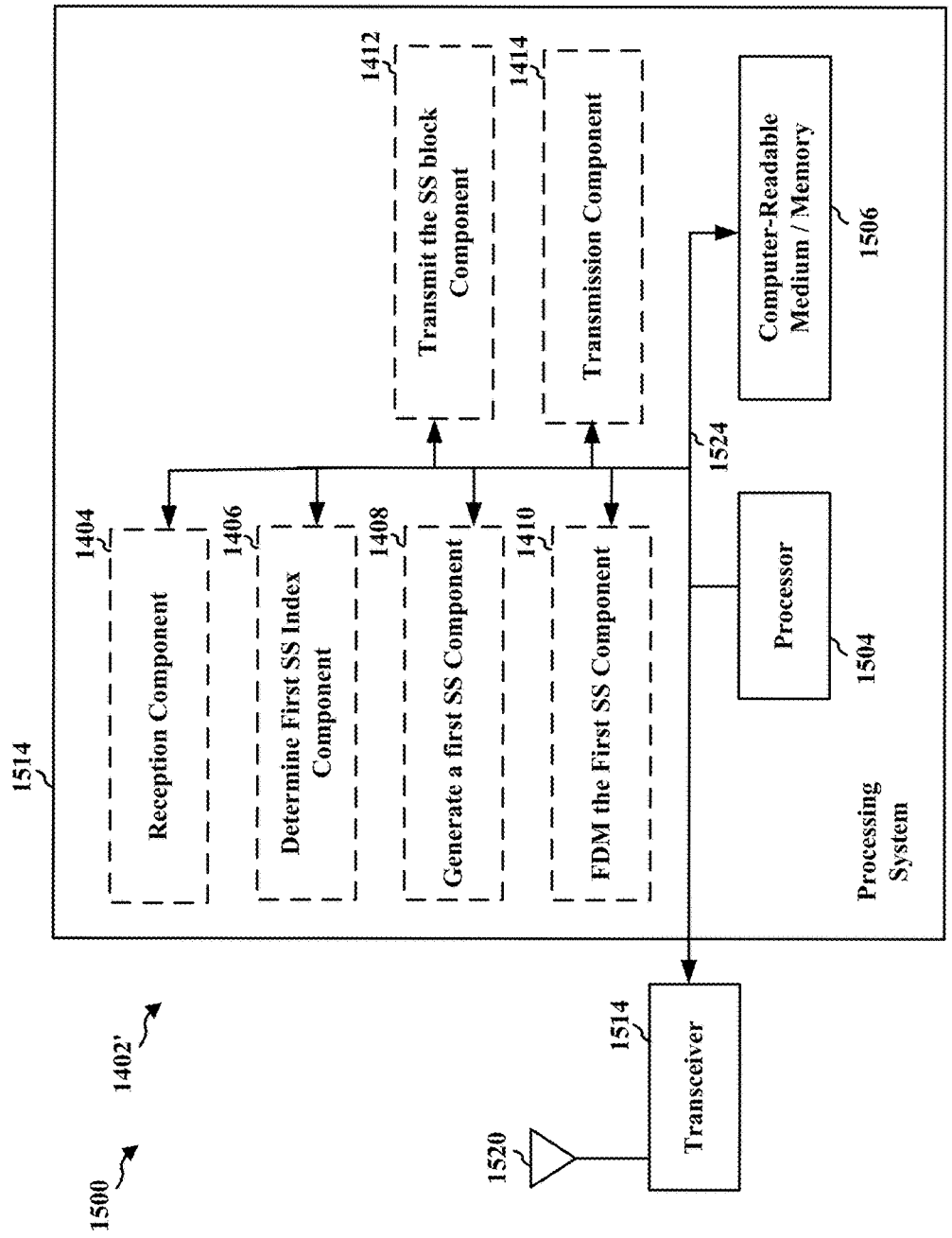
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, 1414, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1418, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412, 1414. The components may be software components running in the processor 1504, resident/stored in the computer readable medium/memory 1506, one or more hardware components coupled to the processor 1504, or some combination thereof. The processing system 1514 may be a component of the base station 310 and may include the memory 376 and/or at least one of the TX processor 316, the RX processor 370, and the controller/processor 375.

In one configuration, the apparatus 1402/1402' for wireless communication includes means for determining a synchronization signal (SS) index for a SS block, the SS block comprising a plurality of synchronization signals multiplexed for transmission on predetermined resources, means for generating a first SS of the plurality of synchronization signals based at least in part on the SS index, means for frequency division multiplexing the first SS with at least a second synchronization signal (SSS) of the SS block, wherein the SSS comprises a secondary synchronization signal that carries information about a physical layer cell identity group number for the base station, and means for transmitting the first SS block including the SS generated based at least in part on the SS block identifier frequency division multiplexed with the SSS on the predetermined resources.

The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 16:
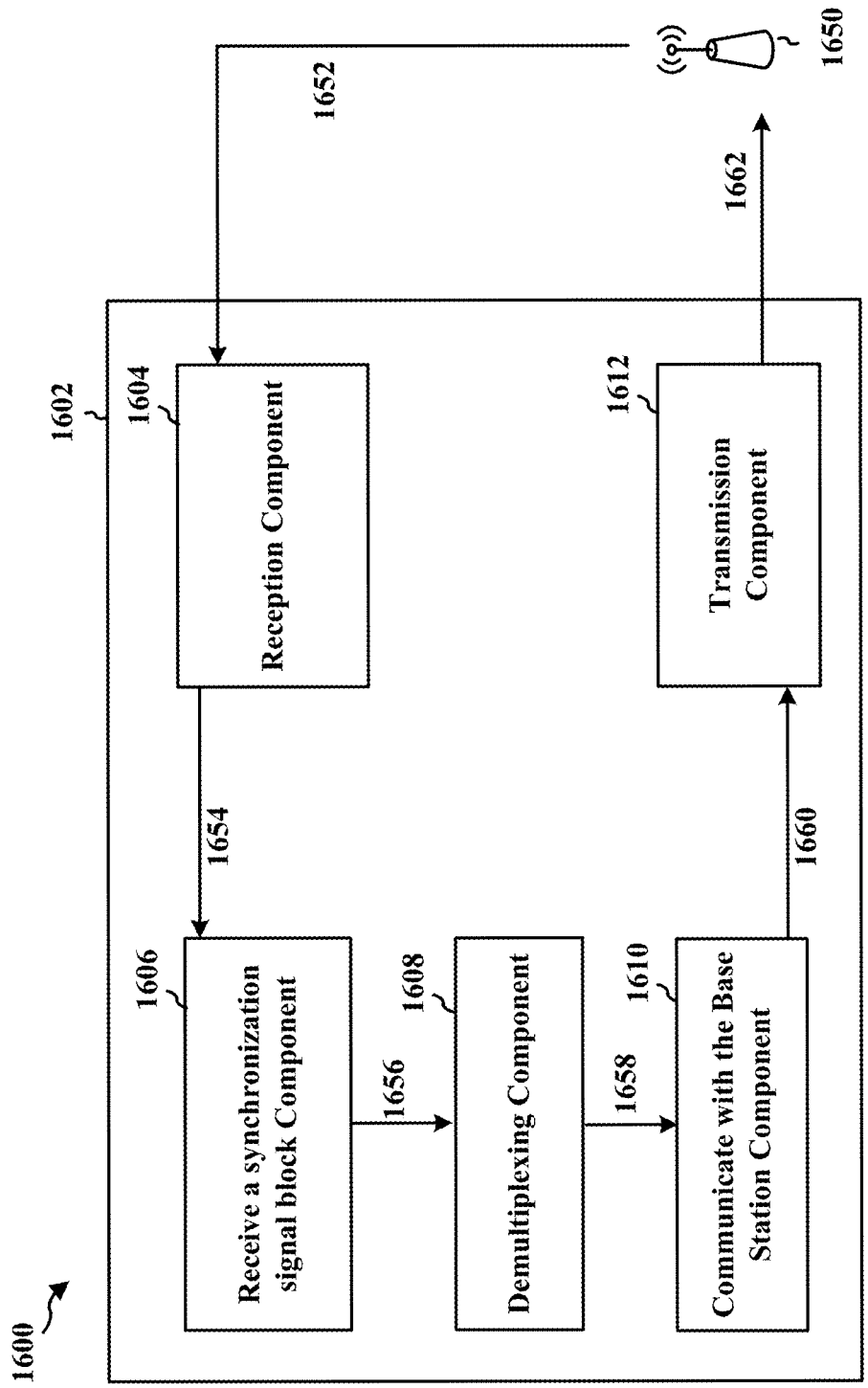
FIG. 16 is a conceptual data flow diagram illustrating the data flow between different means/components in an exemplary apparatus.

FIG. 16 is a conceptual data flow diagram 1600 illustrating the data flow between different means/components in an exemplary apparatus 1602. The apparatus may be a UE. The apparatus includes a component 1604 that receives signals 1652 from a base station 1650. The signals may include an SS block including a SS multiplexed with at least one of a PSS, an SSS, or a PBCH. The apparatus includes a component 1606 that receives a synchronization signal block with a first SS comprising a SS index for the SS block frequency division multiplexed with a SSS on predetermined resources, wherein the SSS carries information about a physical layer cell identity group number for a base station (1654) from the reception component 1604. The apparatus includes a component 1608 that demultiplexes the SS and the SSS (1656) and obtains the SS index and the information about the physical layer cell identity group number for the base station (1658), a component 1610 that communicates with the base station based on information from the base station (1660) using transmission component 1612, which transmits signals (1662).

The apparatus may include additional components that perform each of the blocks of the algorithm in the aforementioned flowcharts of FIG. 13. As such, each block in the aforementioned flowcharts of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
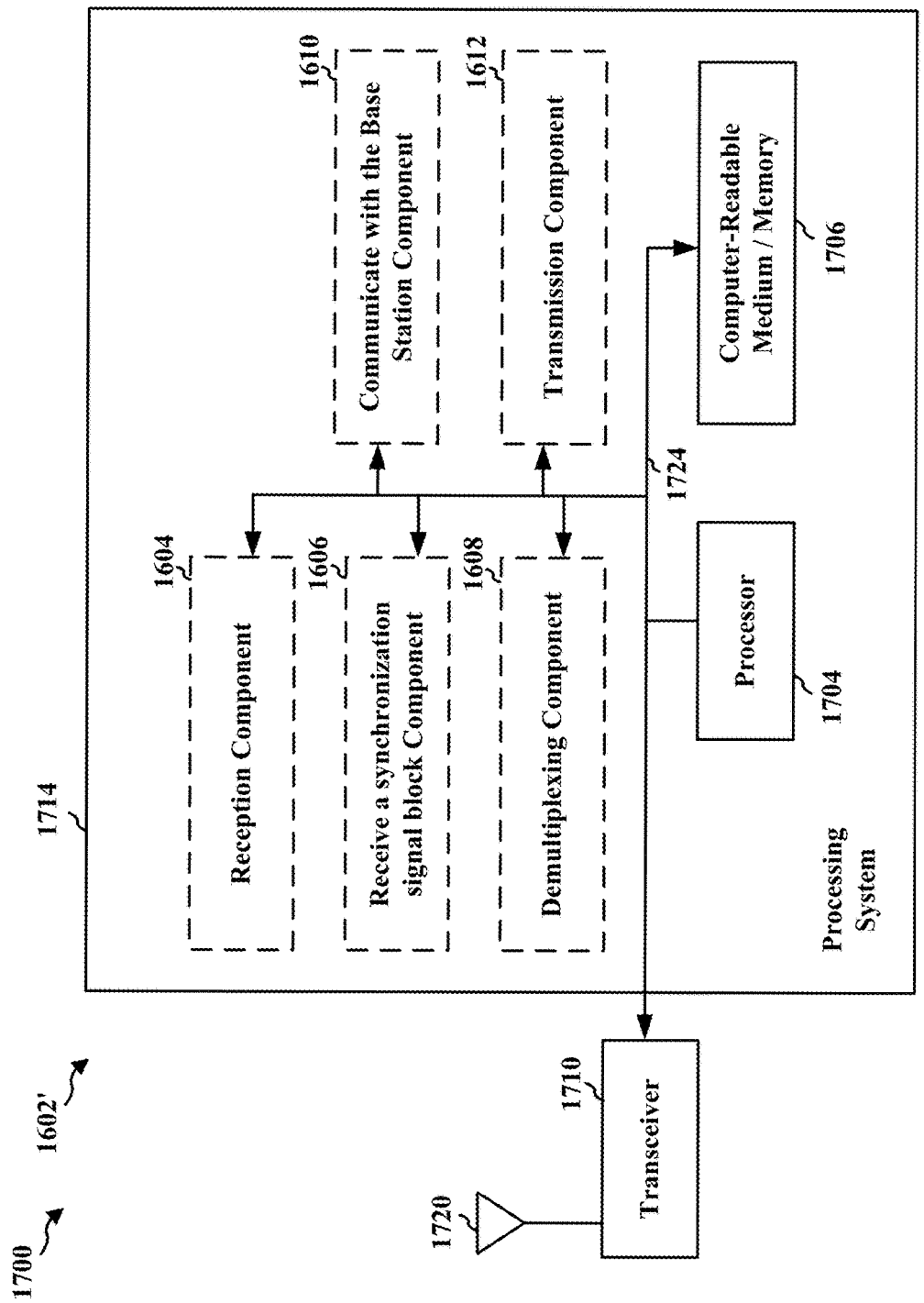
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, 1610, 1612, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1614, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1604, 1606, 1608, 1610, 1612. The components may be software components running in the processor 1704, resident/stored in the computer readable medium/memory 1706, one or more hardware components coupled to the processor 1704, or some combination thereof. The processing system 1714 may be a component of the UE 350 and may include the memory 360 and/or at least one of the TX processor 368, the RX processor 356, and the controller/processor 359.

In one configuration, the apparatus 1602/1602' for wireless communication includes means for receiving a synchronization signal block with a first SS comprising a SS index for the SS block frequency division multiplexed with a SSS on predetermined resources, wherein the SSS carries information about a physical layer cell identity group number for a base station, means for demultiplexing the first SS and the SSS and obtaining the SS index and the information about the physical layer cell identity group number for the base station, and means for communicating with the base station based on information from the SS block.

The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

In an aspect, the synchronization signal comprises a demodulation reference signal for a PBCH of the synchronization block.

In an aspect, the SS block index information is conveyed using a shift of a PN sequence of the SS.

In an aspect, the SS comprises a DMRS for a physical broadcast channel PBCH.

In an aspect, the SS is frequency division multiplexed with at least one of the PSS, the SSS, or the PBCH in the same set of OFDM symbols.

In an aspect, the SS is time division multiplexed with the PSS, the SSS, and the PBCH in a same set of subcarriers.

In an aspect, the SS is frequency division multiplexed with the SSS in the same set of OFDM symbols.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a base station, comprising:
   determining a synchronization signal (SS) index for a SS block, the SS block comprising a plurality of synchronization signals multiplexed for transmission on predetermined resources;
   generating a first SS of the plurality of synchronization signals using the SS index;
   frequency division multiplexing the first SS with at least a second synchronization signal (SSS) of the SS block, wherein the SSS comprises a secondary synchronization signal that carries information about a physical layer cell identity group number for the base station; and
   transmitting the SS block including the first SS generated using the SS index frequency division multiplexed with the SSS on the predetermined resources, wherein the first SS is frequency division multiplexed with the SSS in at least one OFDM symbol, and wherein the SS index is conveyed using a shift of a pseudo-noise (PN) sequence of the first SS.

2. The method of claim 1, wherein the first SS comprises a demodulation reference signal for a physical broadcast channel (PBCH) of the SS block.

3. A method of wireless communication by a user equipment (UE), comprising:
   receiving a synchronization signal (SS) block with a first SS comprising a SS index for the SS block frequency division multiplexed with a second synchronization signal (SSS) on predetermined resources, wherein the SSS comprises a secondary synchronization signal that carries information about a physical layer cell identity group number for a base station, wherein the first SS is frequency division multiplexed with the SSS in at least one OFDM symbol;
   demultiplexing the first SS and the SSS and obtaining the SS index and the information about the physical layer cell identity group number for the base station, wherein the SS index is conveyed using a shift of a pseudo-noise (PN) sequence of the first SS; and
   communicating with the base station based on information obtained from the SS block.

4. The method of claim 3, wherein the first SS comprises a demodulation reference signal for a physical broadcast channel (PBCH) of the SS block.

5. An apparatus for wireless communication, comprising:
   means for determining a synchronization signal (SS) index for a SS block, the SS block comprising a plurality of synchronization signals multiplexed for transmission on predetermined resources;
   means for generating a first SS of the plurality of synchronization signals using the SS index;
   means for frequency division multiplexing the first SS with at least a second synchronization signal (SSS) of the SS block, wherein the SSS comprises a secondary synchronization signal that carries information about a physical layer cell identity group number for the apparatus; and
   means for transmitting the SS block including the first SS generated using the SS index frequency division multiplexed with the SSS on the predetermined resources, wherein the first SS is frequency division multiplexed with the SSS in at least one OFDM symbol, and wherein the SS index is conveyed using a shift of a pseudo-noise (PN) sequence of the first SS.

6. The apparatus of claim 5, wherein the first SS comprises a demodulation reference signal for a physical broadcast channel (PBCH) of the synchronization block.

7. An apparatus for wireless communication, comprising:
   means for receiving a synchronization signal (SS) block with a first SS comprising a SS index for the SS block frequency division multiplexed with a second synchronization signal (SSS) on predetermined resources, wherein the SSS comprises a secondary synchronization signal that carries information about a physical layer cell identity group number for a base station, wherein the first SS is frequency division multiplexed with the SSS in at least one OFDM symbol;

means for demultiplexing the first SS and the SSS and obtaining the SS index and the information about the physical layer cell identity group number for the base station, wherein the SS index is conveyed using a shift of a pseudo-noise (PN) sequence of the first SS; and means for communicating with the base station based on information obtained for the SS block.

8. The apparatus of claim 7, wherein the first SS comprises a demodulation reference signal for a physical broadcast channel (PBCH) of the SS block.

9. The method of claim 1, wherein the SS block further comprises at least one OFDM symbol in which the first SS is sent and the SSS is not sent.

10. The method of claim 3, wherein the SS block further comprises at least one OFDM symbol in which the first SS is sent and the SSS is not sent.

11. The apparatus of claim 5, wherein the SS block further comprises at least one OFDM symbol in which the first SS is sent and the SSS is not sent.

12. The apparatus of claim 7, wherein the SS block further comprises at least one OFDM symbol in which the first SS is sent and the SSS is not sent.

13. The method of claim 3, wherein communicating with the base station includes communicating with the base station based on the SS index obtained for the SS block.

14. The apparatus of claim 7, wherein the means for communicating with the base station communicate with the base station based on the SS index obtained for the SS block.

* * * * *